US010671175B2

(12) United States Patent
Shigeta

(10) Patent No.: US 10,671,175 B2
(45) Date of Patent: *Jun. 2, 2020

(54) IMAGE PROCESSING APPARATUS, IMAGE PROCESSING METHOD, AND PROGRAM PRODUCT TO CONTROL A DISPLAY TO DISPLAY AN IMAGE GENERATED BASED ON A MANIPULATION TARGET IMAGE

(71) Applicant: SONY CORPORATION, Tokyo (JP)

(72) Inventor: Osamu Shigeta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 16/108,172

(22) Filed: Aug. 22, 2018

(65) Prior Publication Data

US 2019/0004615 A1    Jan. 3, 2019

Related U.S. Application Data

(63) Continuation of application No. 15/337,029, filed on Oct. 28, 2016, now Pat. No. 10,073,534, which is a continuation of application No. 14/380,812, filed as application No. PCT/JP2013/003116 on May 16, 2013, now Pat. No. 9,509,915.

(30) Foreign Application Priority Data

Jun. 13, 2012  (JP) .................................. 2012-133786

(51) Int. Cl.
*G06F 3/01* (2006.01)
*G06F 3/03* (2006.01)
*G06K 9/00* (2006.01)
*H04N 5/232* (2006.01)
*G06T 11/60* (2006.01)

(52) U.S. Cl.
CPC .............. *G06F 3/017* (2013.01); *G06F 3/011* (2013.01); *G06F 3/0304* (2013.01); *G06K 9/00221* (2013.01); *G06K 9/00335* (2013.01); *G06T 11/60* (2013.01); *H04N 5/23293* (2013.01)

(58) Field of Classification Search
CPC ........ G06F 3/017; G06F 3/0304; G06F 3/011; G06T 11/60; H04N 5/23293; G06K 9/00335; G06K 9/00221
See application file for complete search history.

(56) References Cited

U.S. PATENT DOCUMENTS 6,088,018 A    7/2000  Deleeuw et al.
9,509,915 B2 * 11/2016  Shigeta .................. G06F 3/011
(Continued)

FOREIGN PATENT DOCUMENTS

EP    1 710 663 A1   10/2006
JP    2005-216061    8/2005
(Continued)

OTHER PUBLICATIONS

International Search Report dated Aug. 14, 2013 in PCT/JP2013/003116.

*Primary Examiner* — Maurice L. McDowell, Jr.
(74) *Attorney, Agent, or Firm* — Xsensus LLP

(57) ABSTRACT

An information processing system that controls a display to display an image generated based on a manipulation target image and an image based on a manipulation target region that is set based on a detection of an object included in acquired image data.

17 Claims, 24 Drawing Sheets

(56) References Cited

U.S. PATENT DOCUMENTS

| | | |
|---|---|---|
| 10,073,534 B2 * | 9/2018 | Shigeta .............. G06K 9/00335 |
| 2004/0190776 A1 | 9/2004 | Higaki et al. |
| 2006/0238548 A1 | 10/2006 | Stotts, Jr. et al. |
| 2007/0279485 A1 | 12/2007 | Ohba et al. |
| 2008/0013826 A1 | 1/2008 | Hillis et al. |
| 2008/0141181 A1 | 6/2008 | Ishigaki et al. |
| 2009/0254855 A1 | 10/2009 | Kretz et al. |
| 2009/0262187 A1 | 10/2009 | Asada et al. |
| 2010/0141578 A1 | 6/2010 | Horiuchi et al. |
| 2010/0141681 A1 | 6/2010 | Fujii |
| 2011/0107216 A1 | 5/2011 | Bi |
| 2011/0181621 A1 | 7/2011 | Ohba et al. |
| 2011/0243380 A1 | 10/2011 | Forutanpour et al. |
| 2012/0032896 A1 | 2/2012 | Vesely et al. |

FOREIGN PATENT DOCUMENTS

| | | |
|---|---|---|
| JP | 2009-075685 | 4/2009 |
| JP | 2009-089068 | 4/2009 |
| JP | 2009-265709 | 11/2009 |
| JP | 2011-044061 | 3/2011 |
| JP | 2011-186892 | 9/2011 |
| WO | WO 99/65014 A1 | 12/1999 |
| WO | WO 2005/008626 A1 | 1/2005 |
| WO | WO 2010/095204 A1 | 8/2010 |

\* cited by examiner

[Fig. 1]
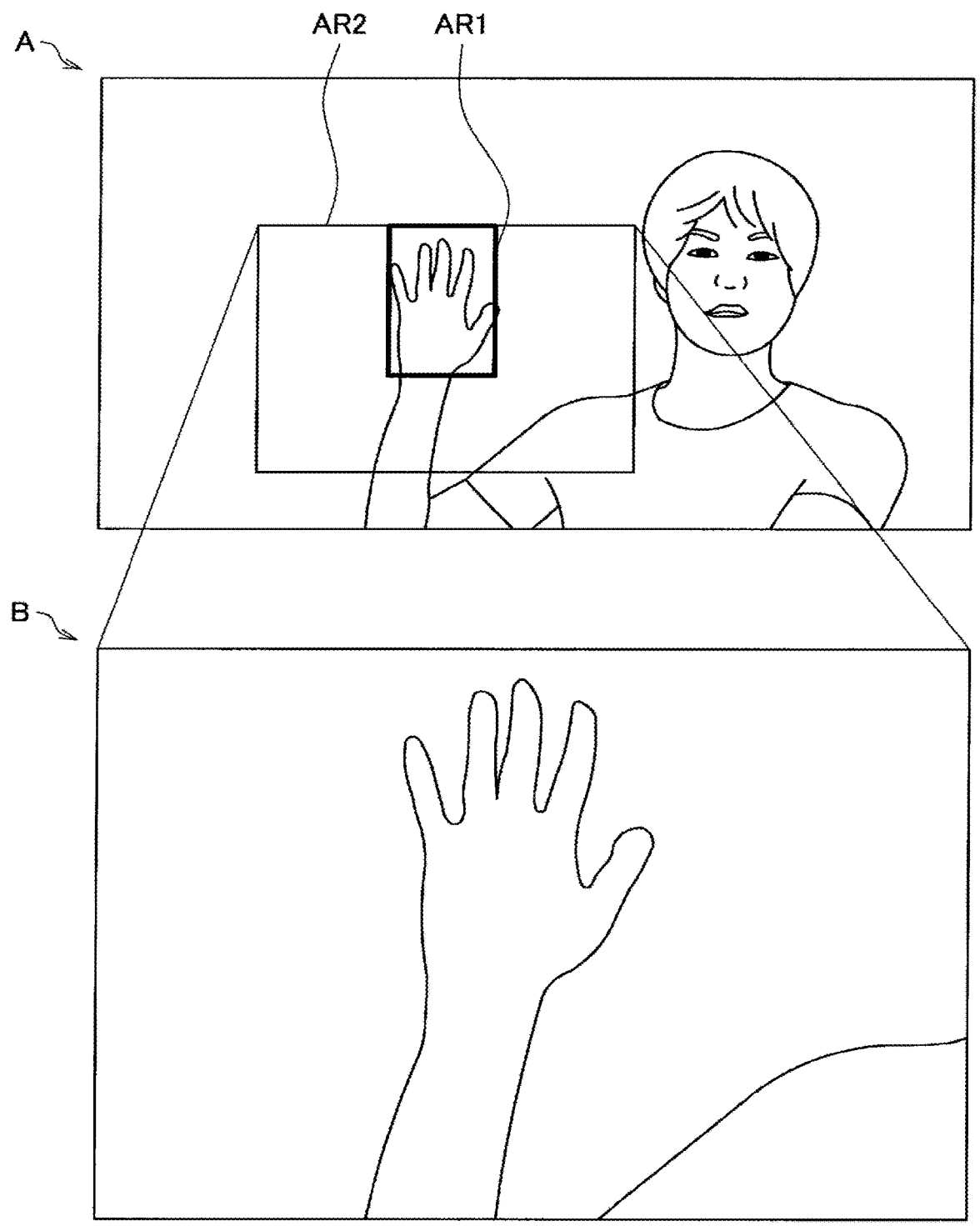

[Fig. 2]
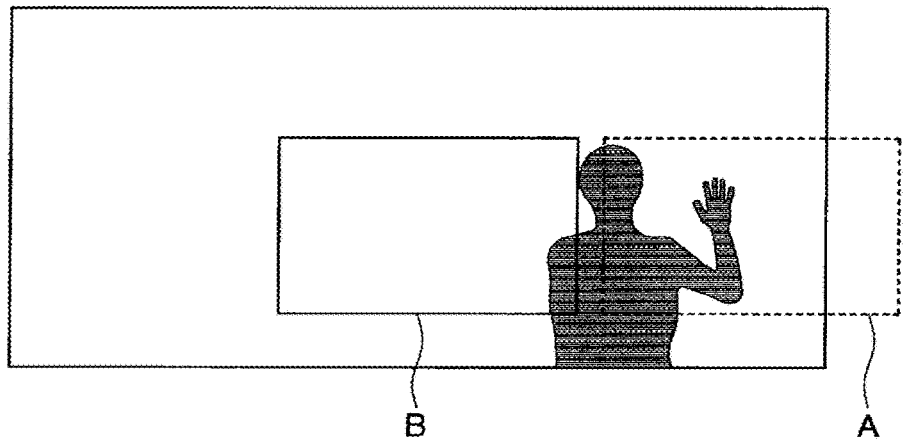
[Fig. 3]
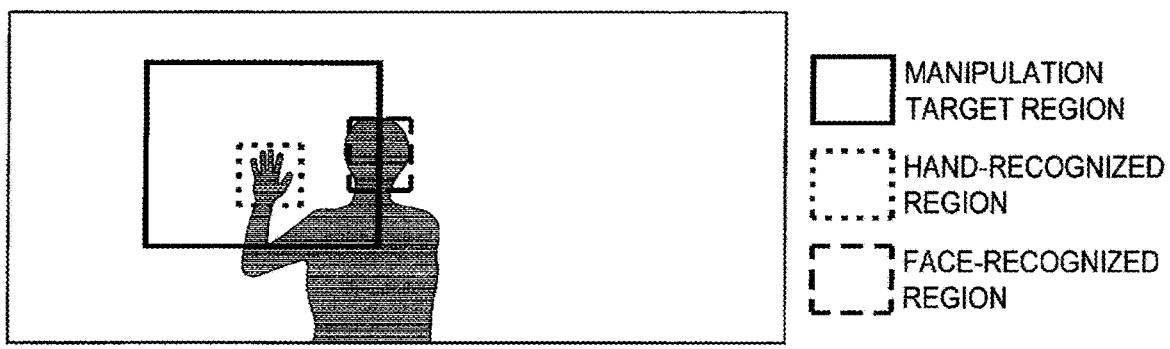
[Fig. 4]
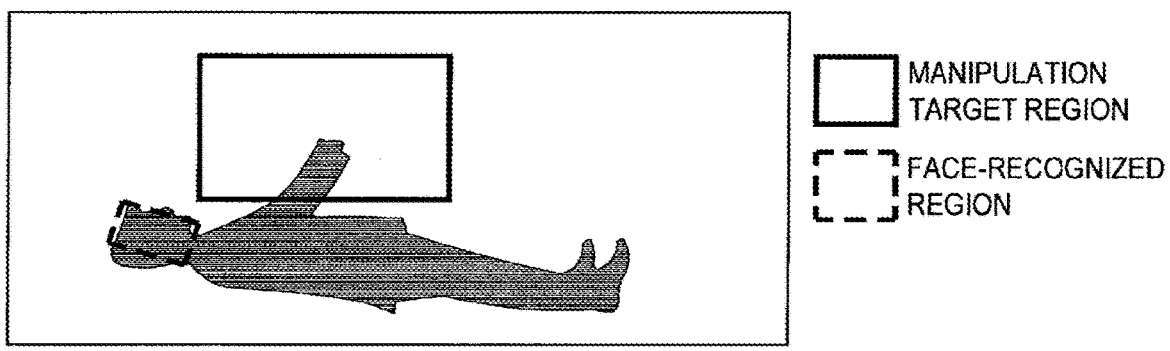

[Fig. 5]
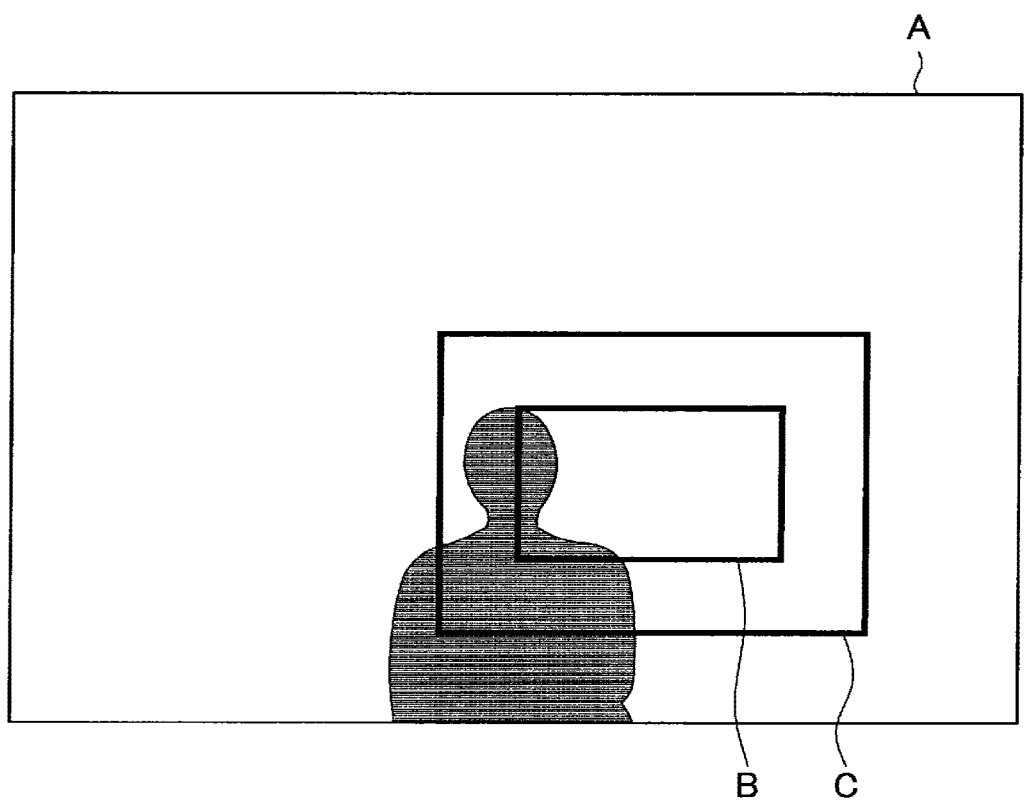

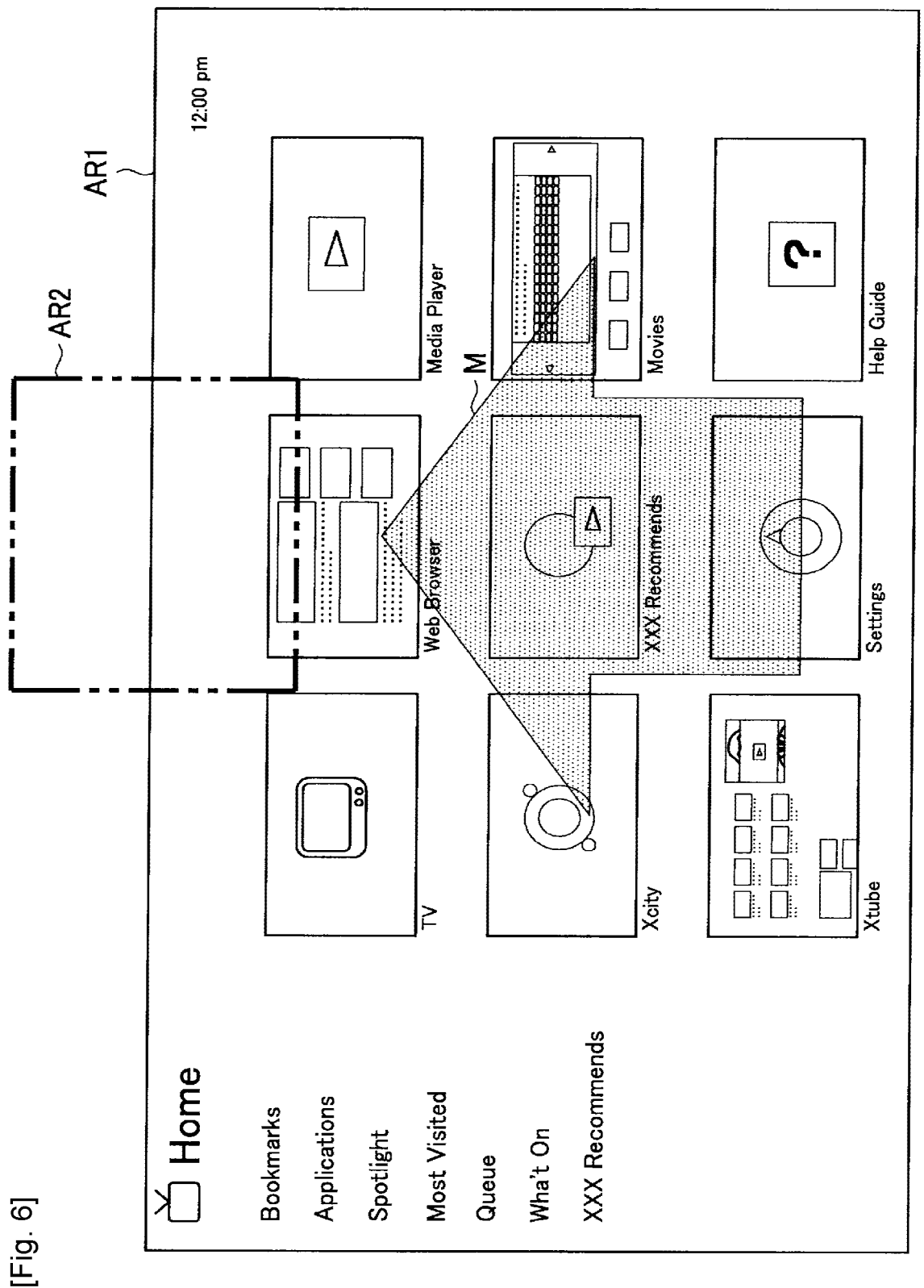
[Fig. 6]

[Fig. 7]
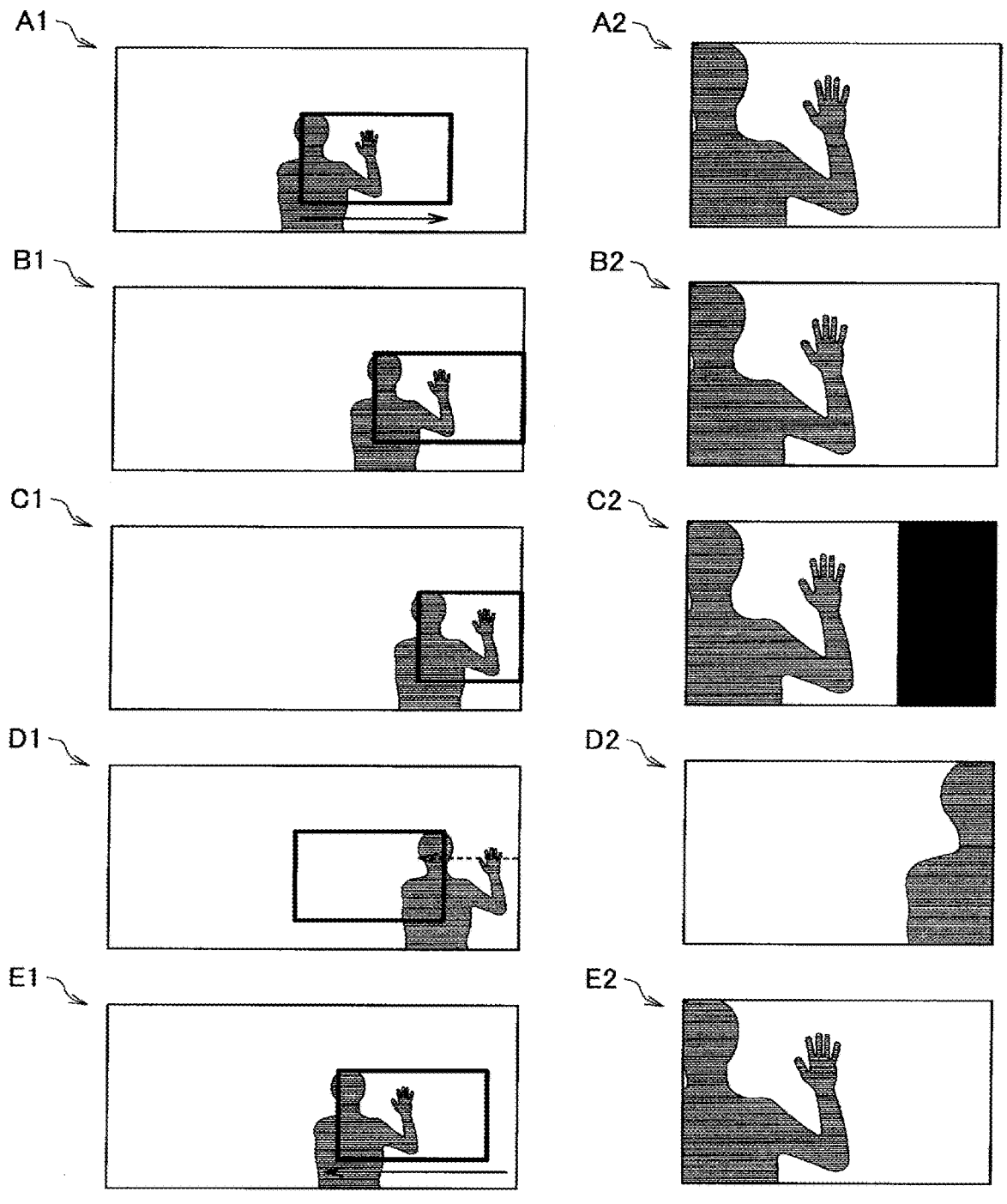

[Fig. 8]
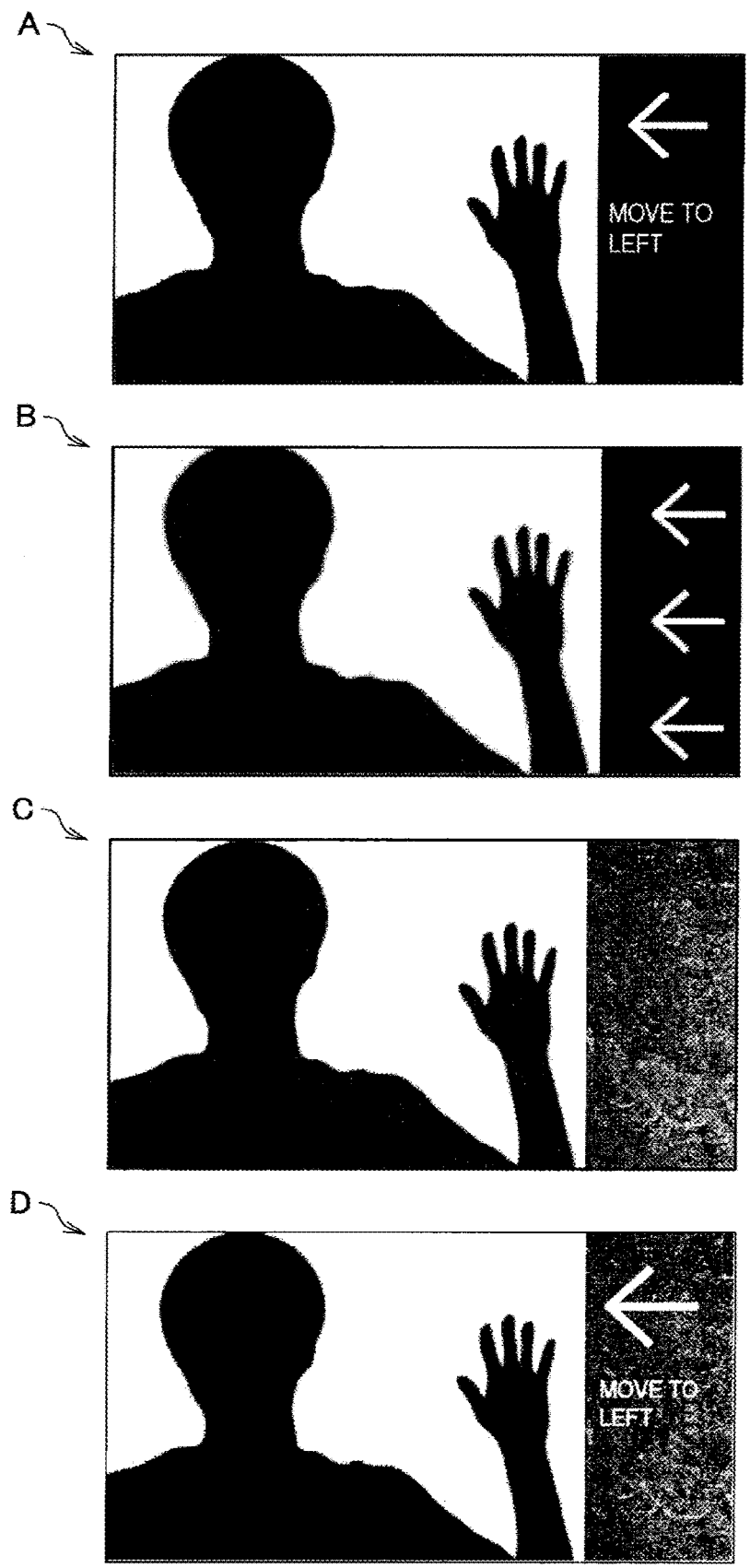

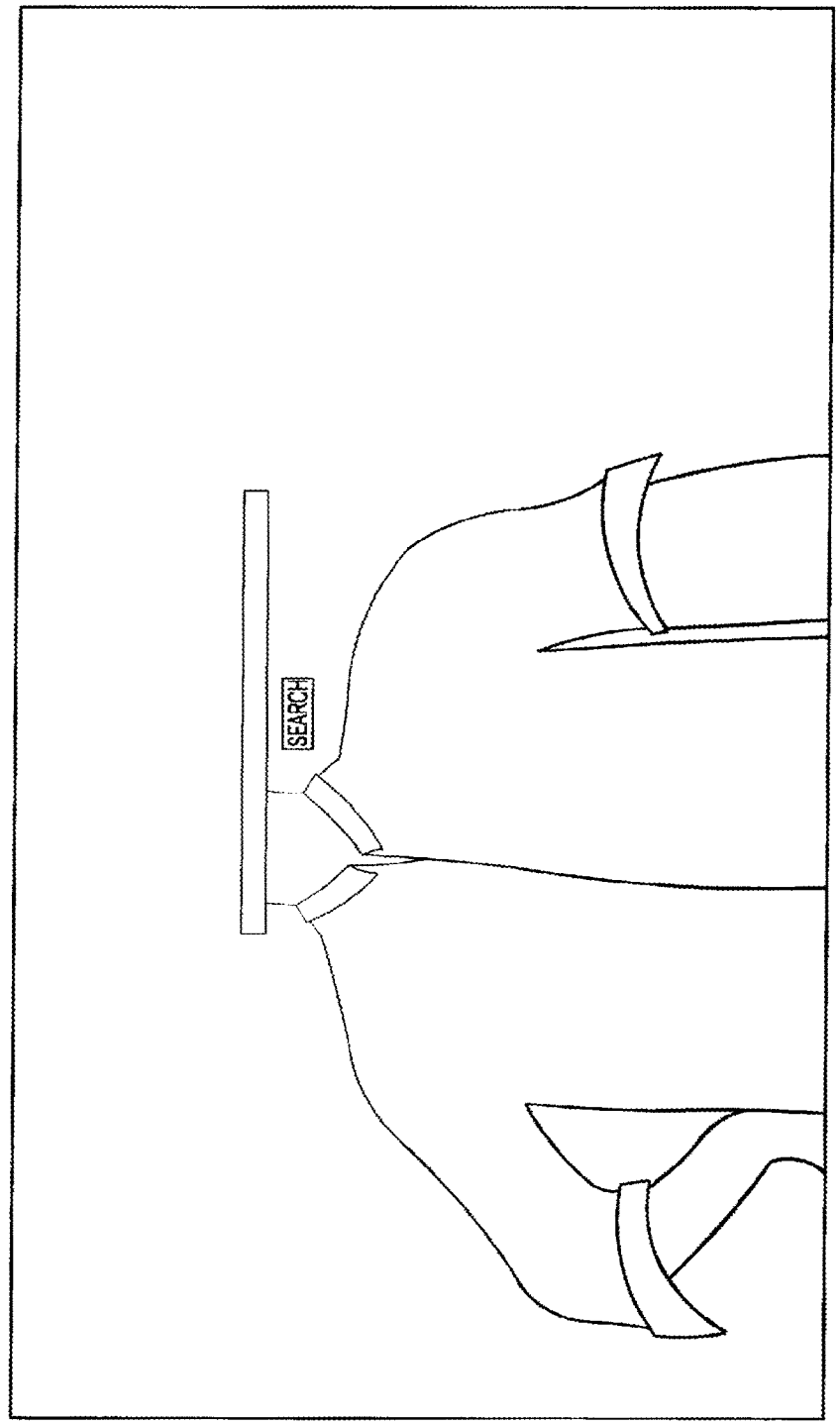
[Fig. 9A]

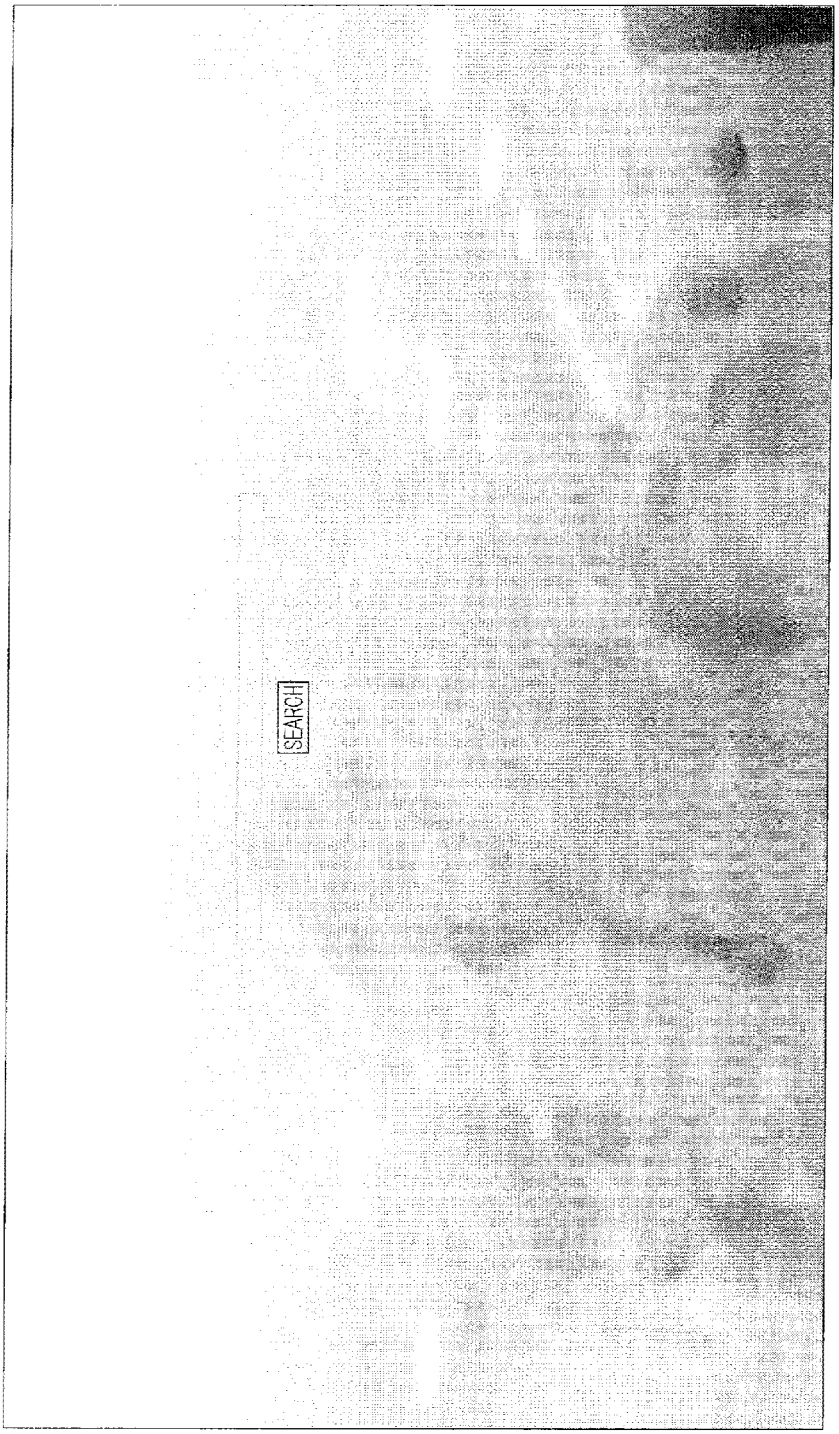
[Fig. 9B]

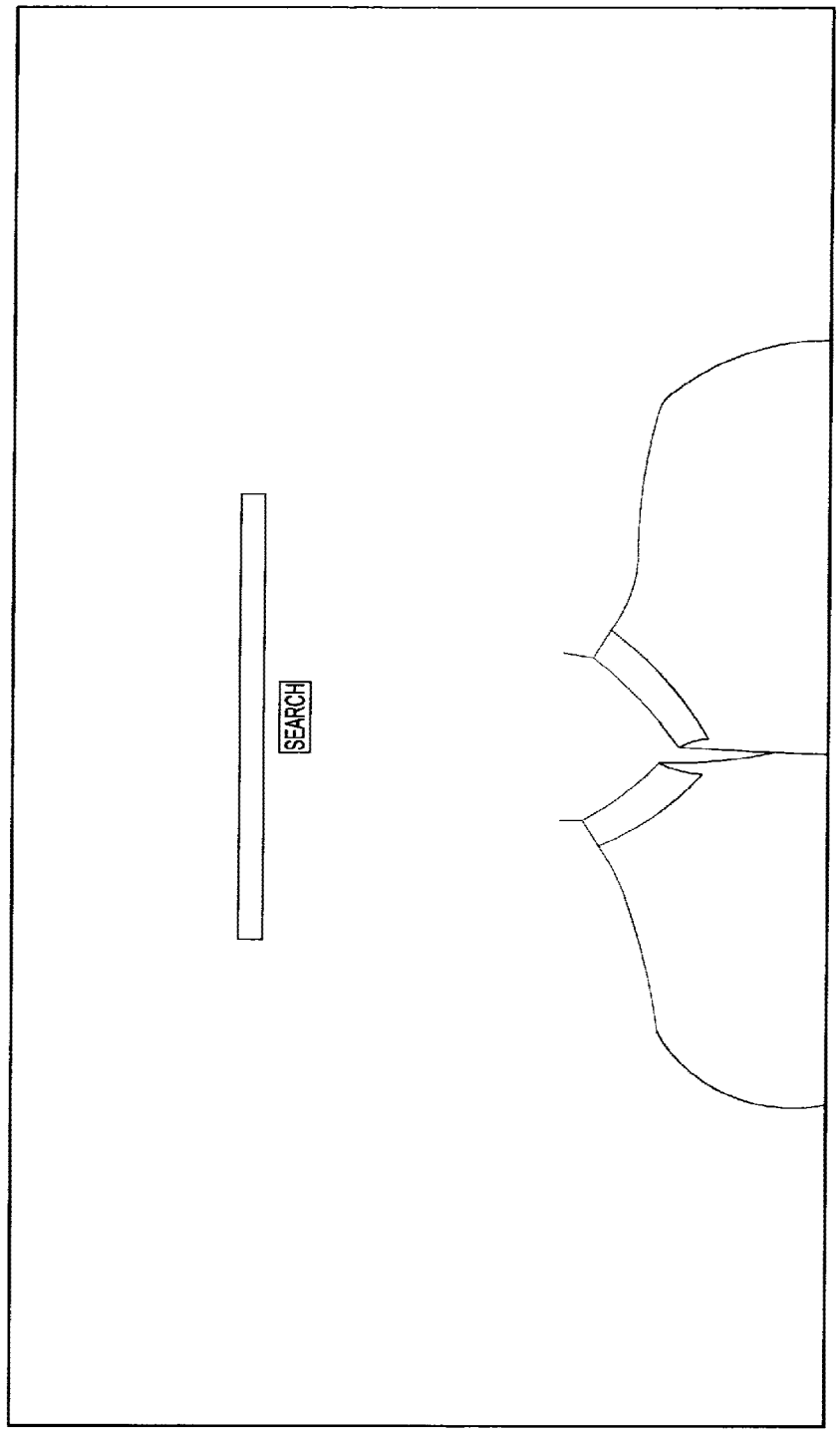
[Fig. 10A]

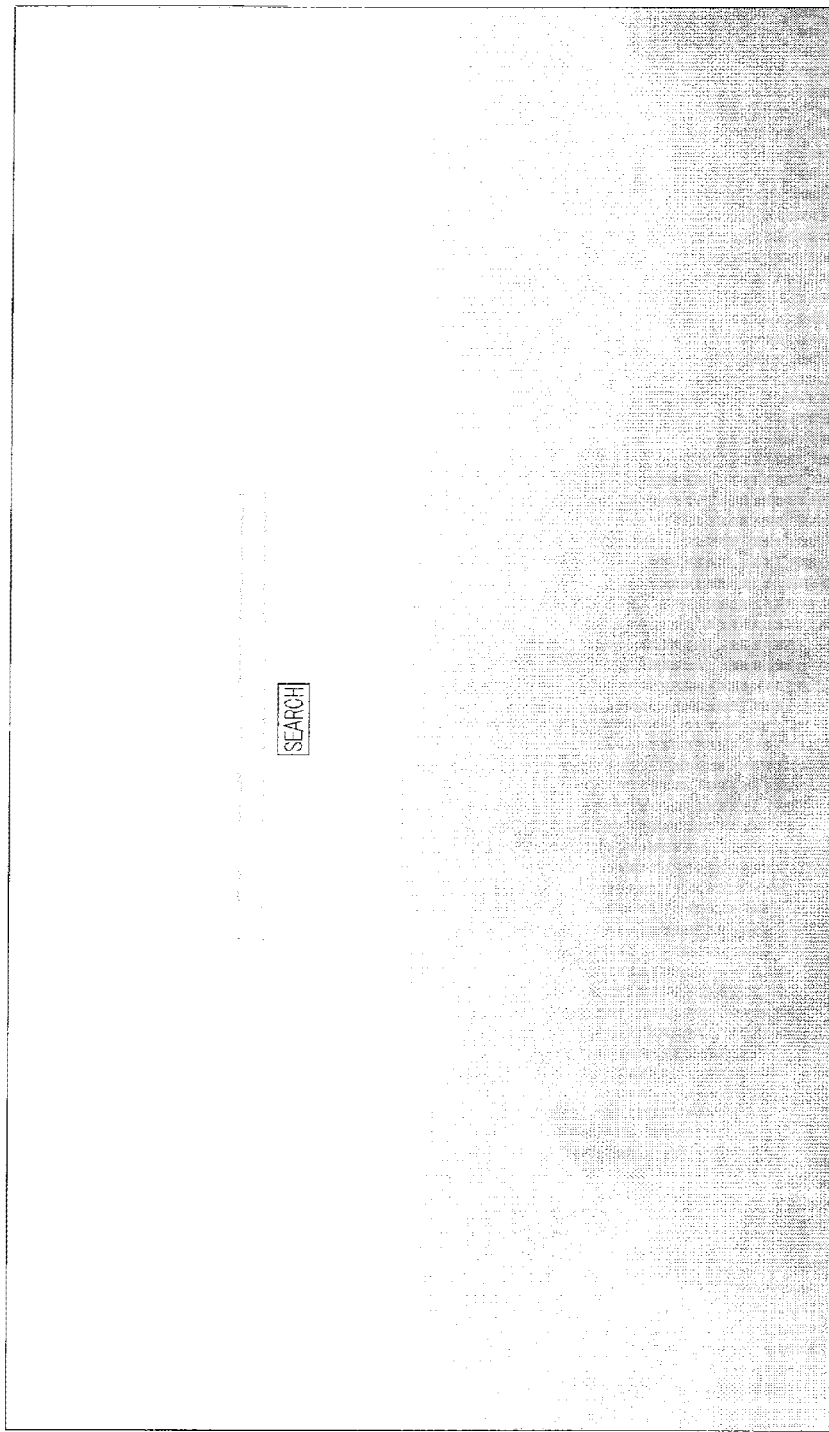
[Fig. 10B]

[Fig. 11]
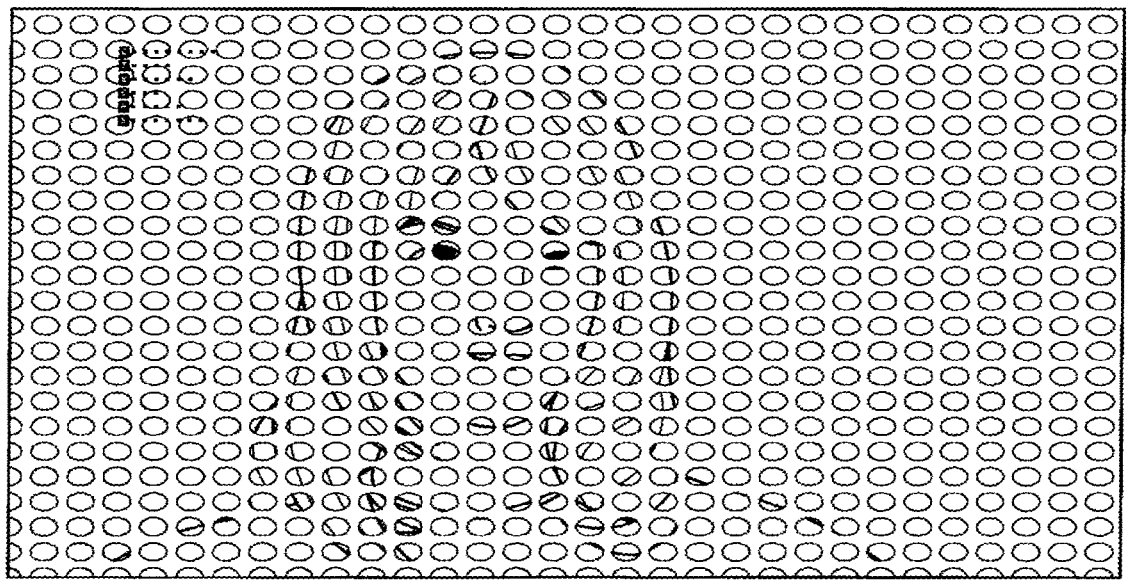

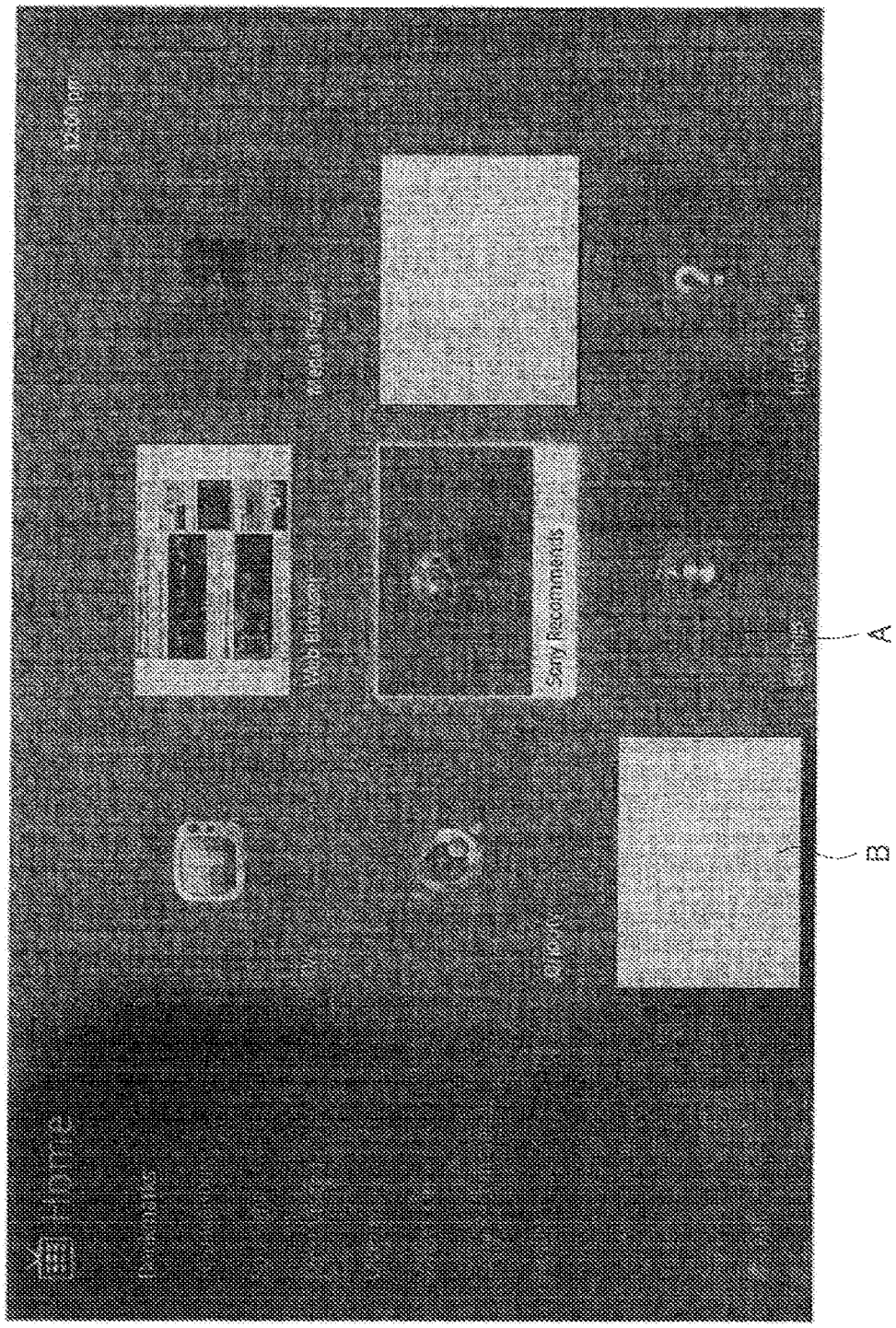
[Fig. 12]

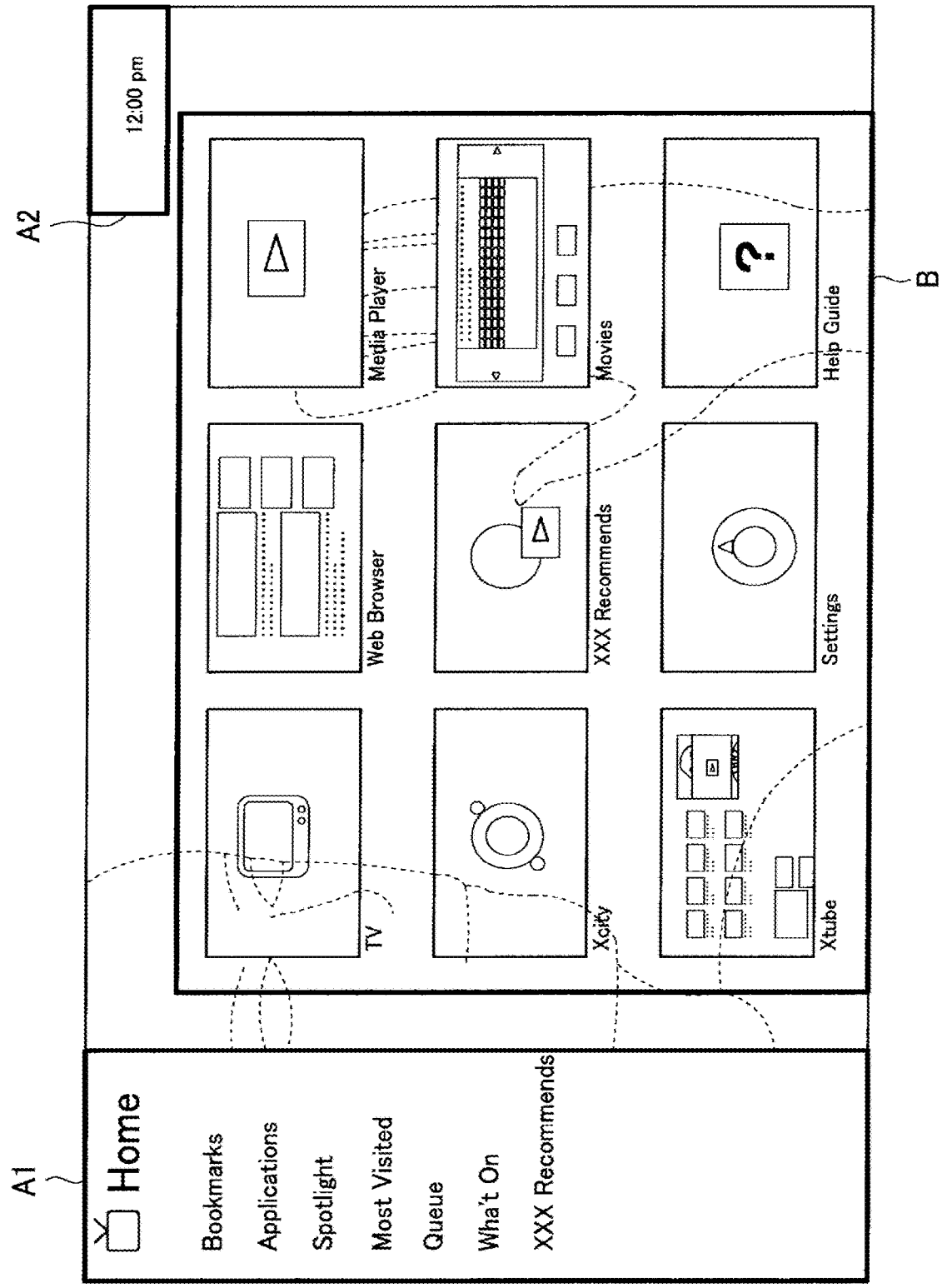
[Fig. 13]

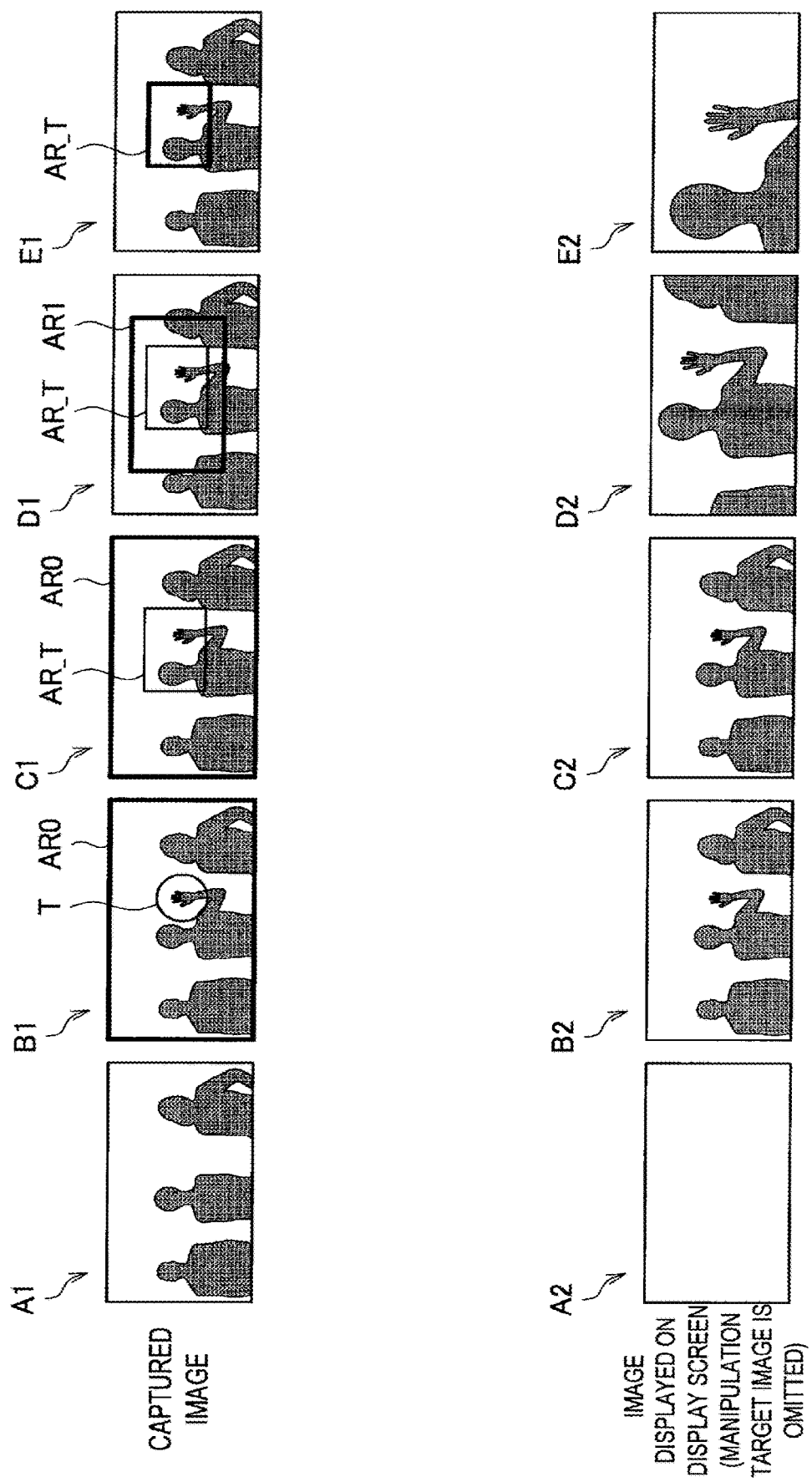

[Fig. 15]
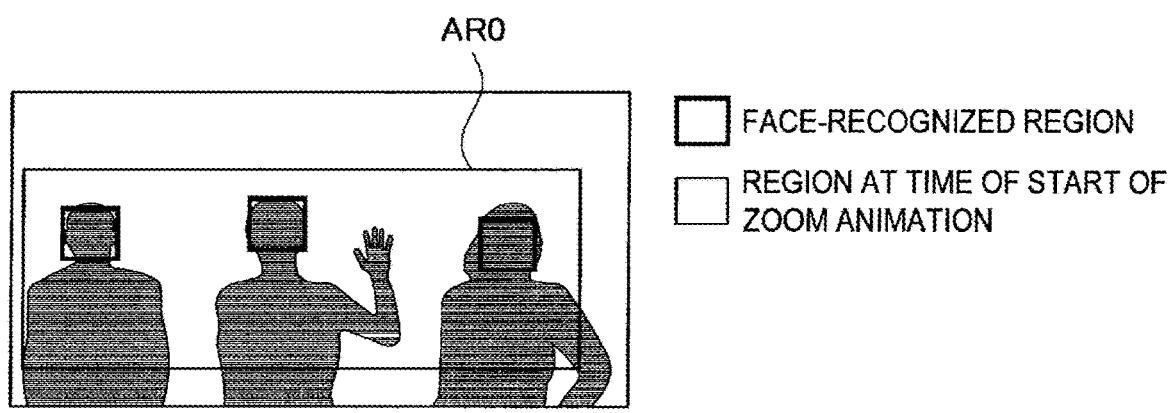

[Fig. 16]
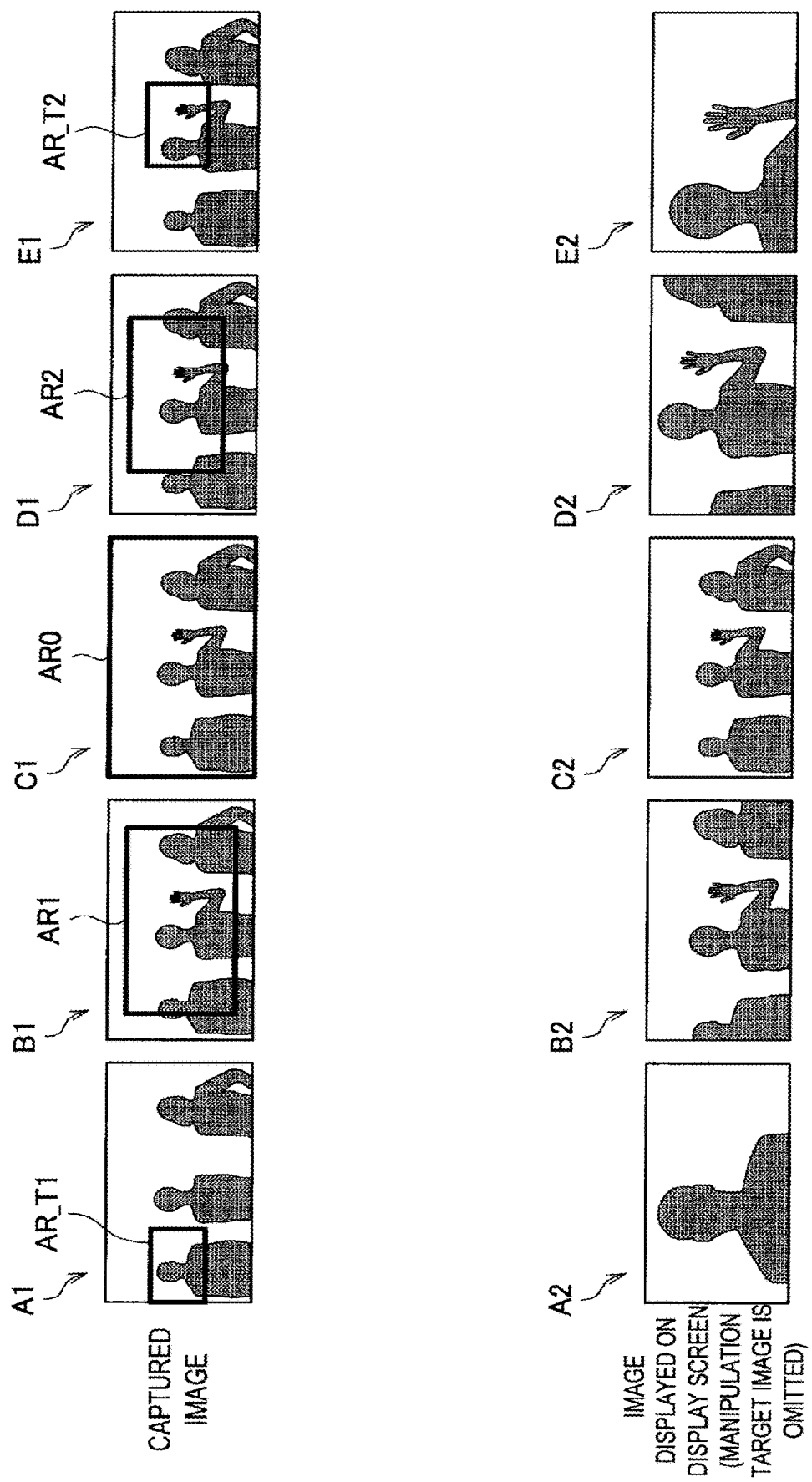

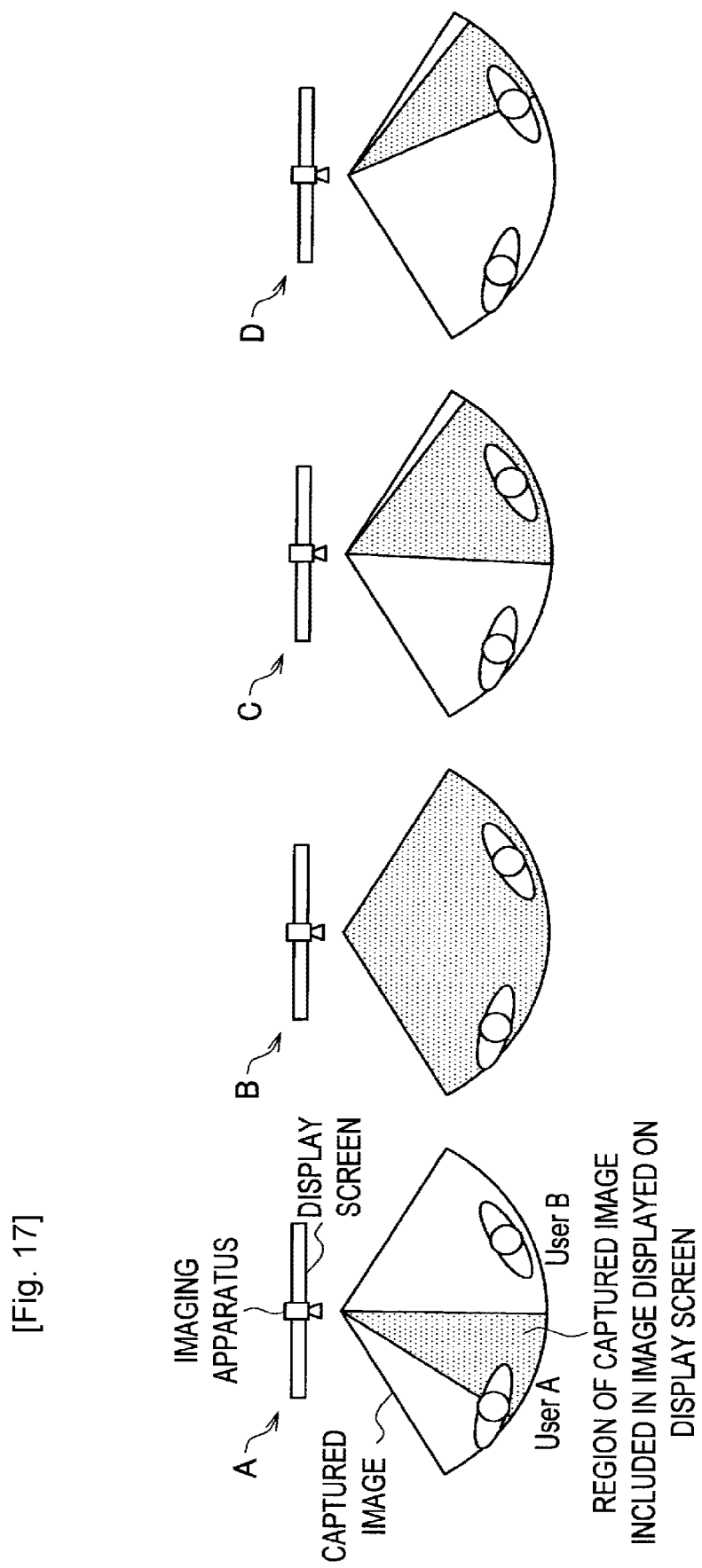

[Fig. 18]
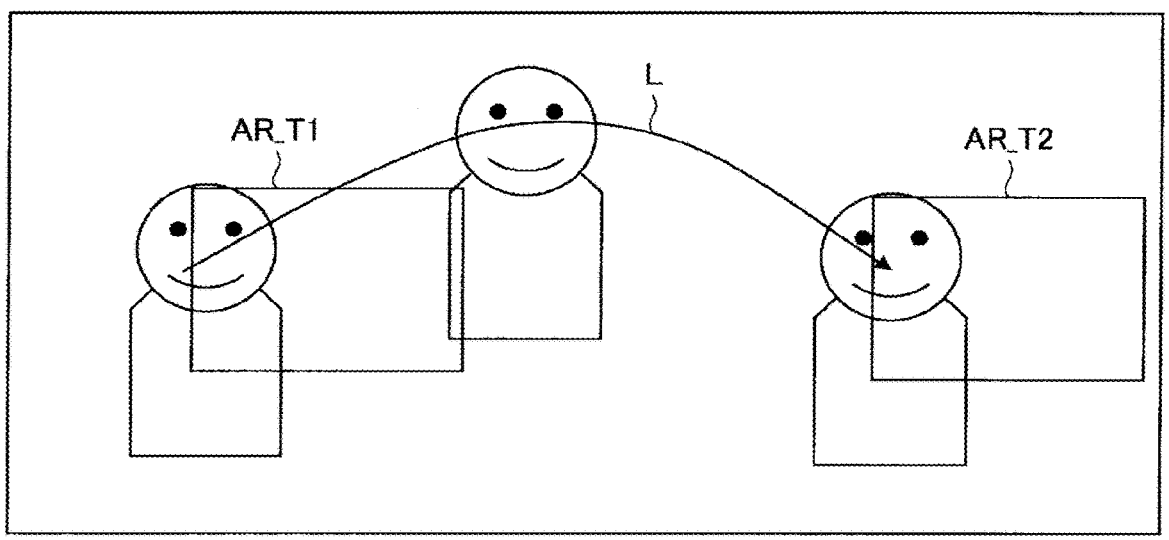

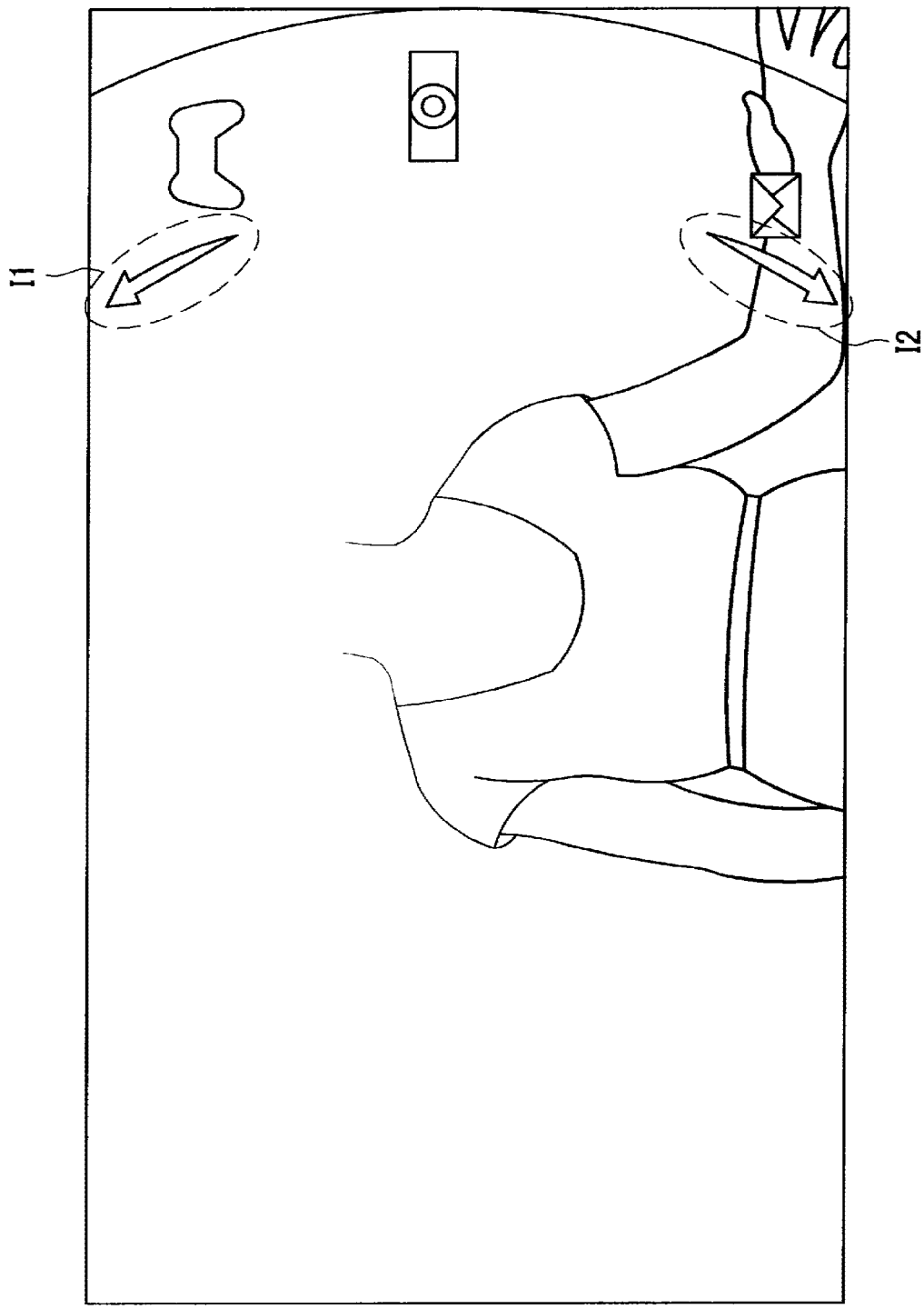
[Fig. 19]

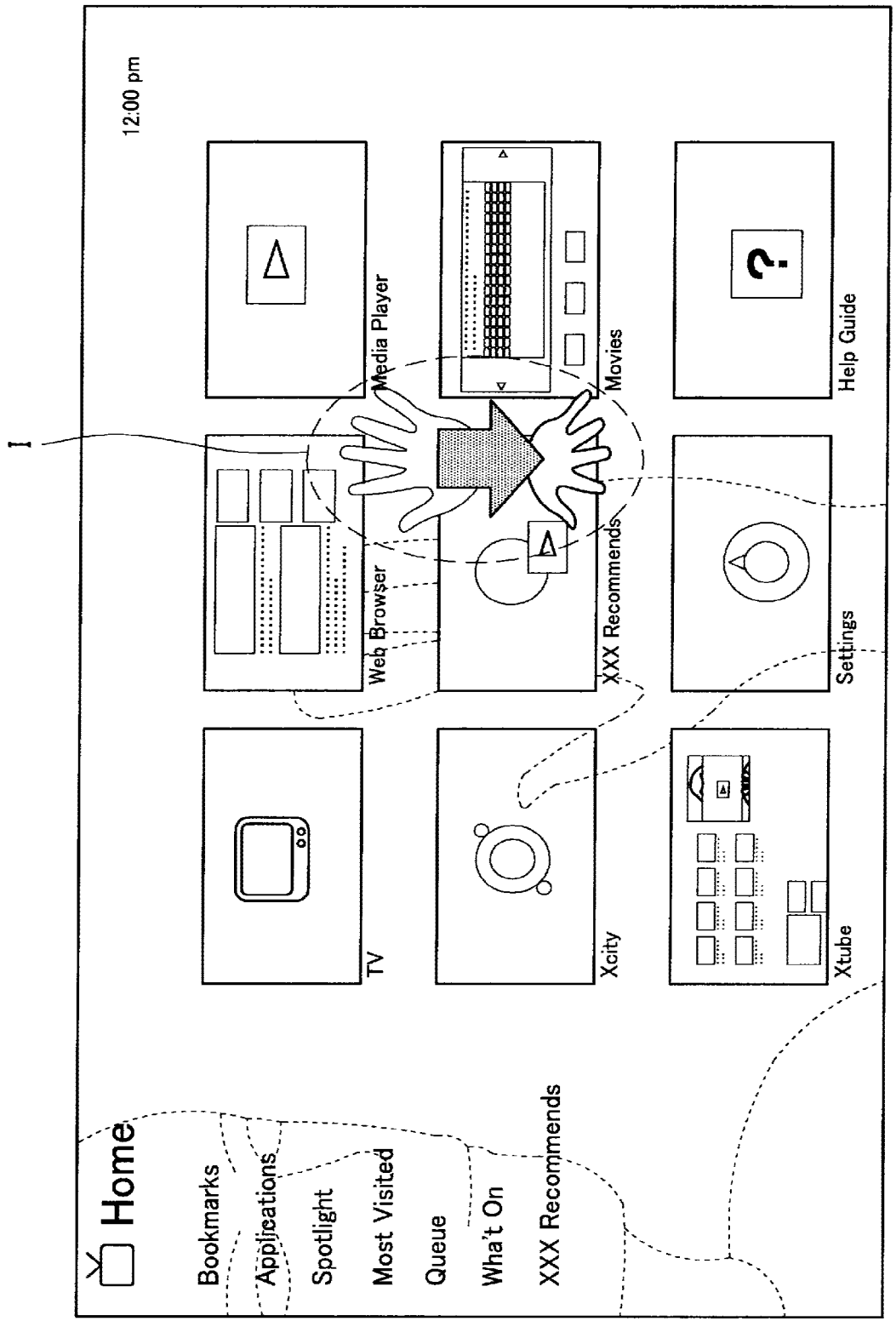
[Fig. 20]

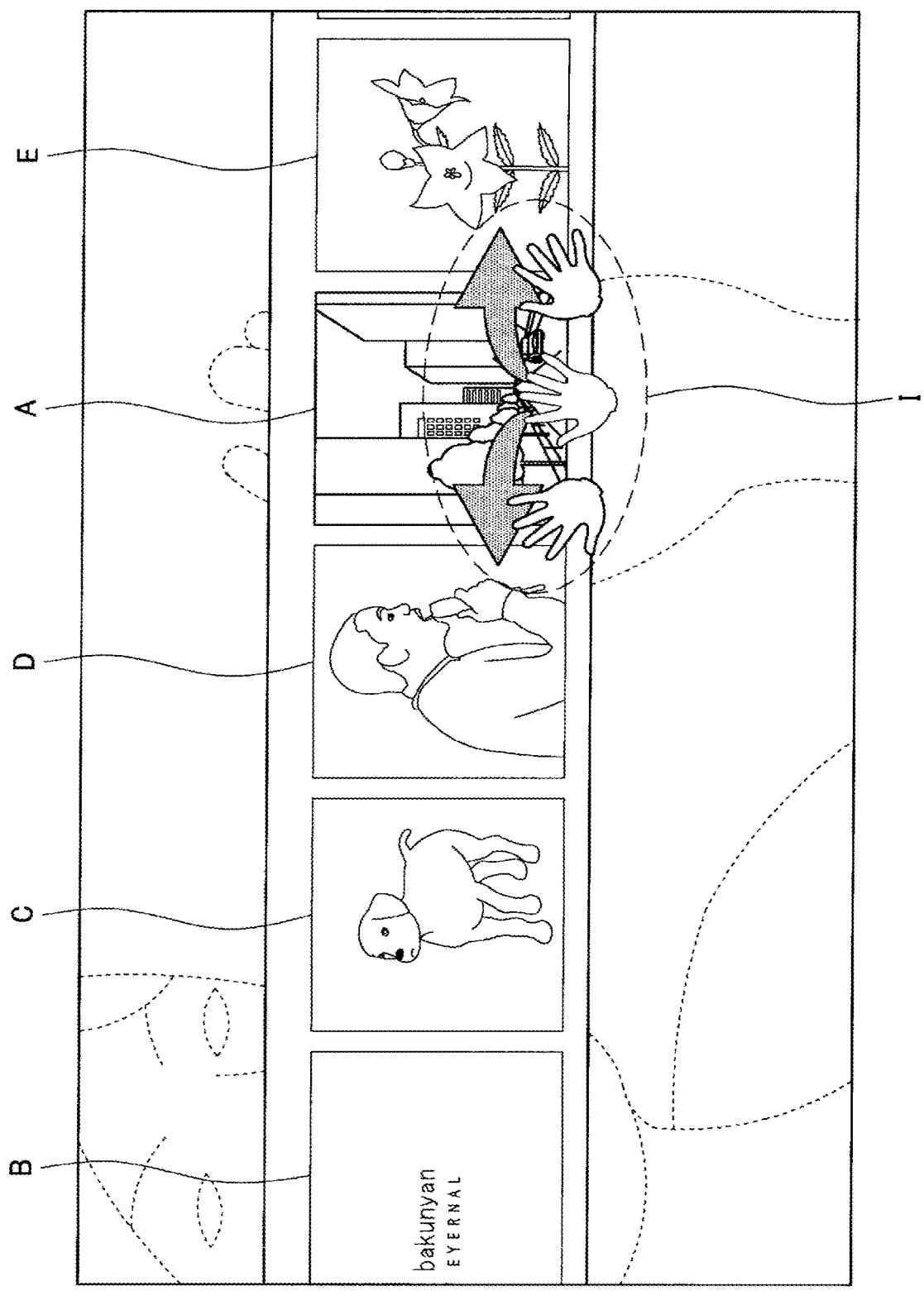

[Fig. 22]
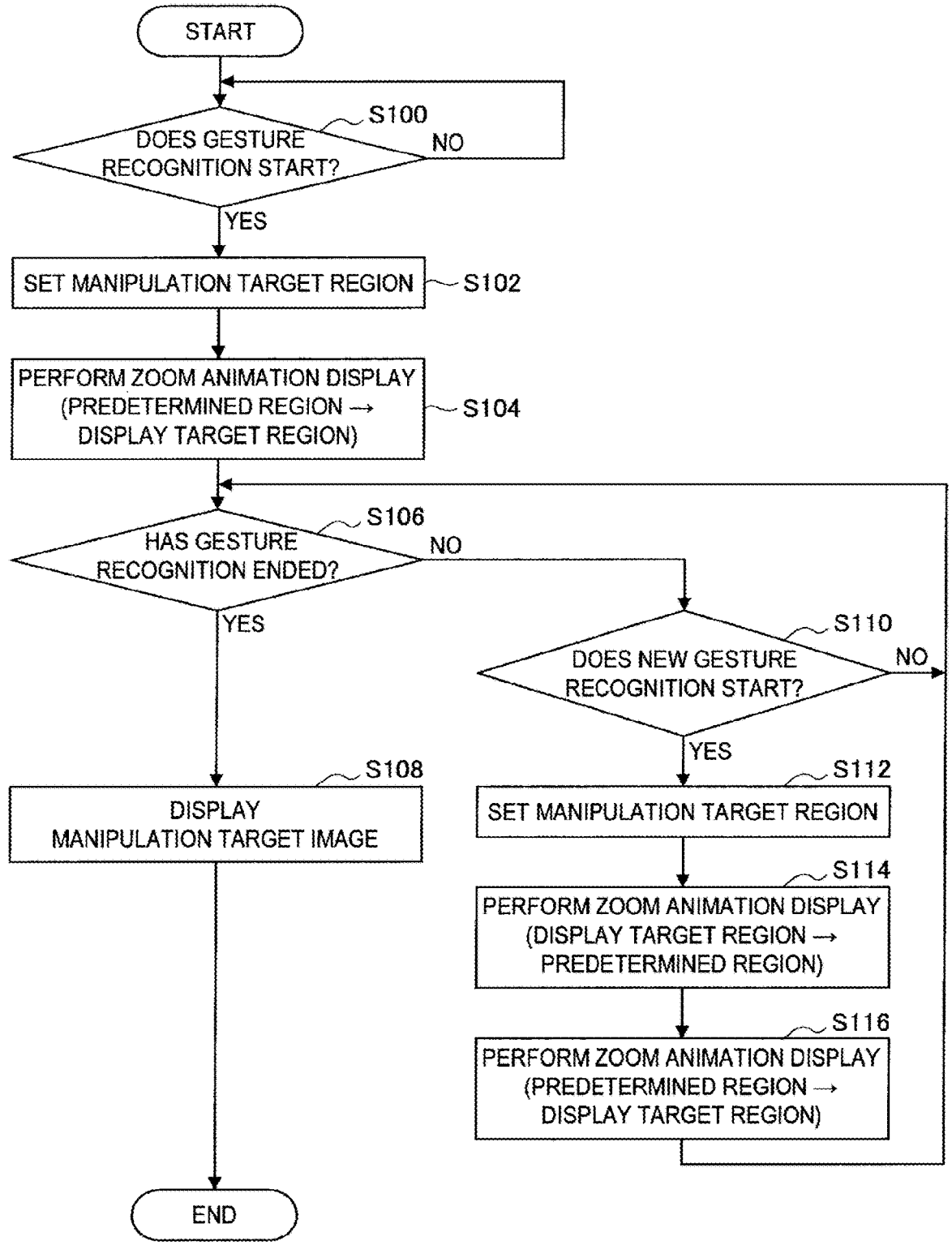

[Fig. 23]
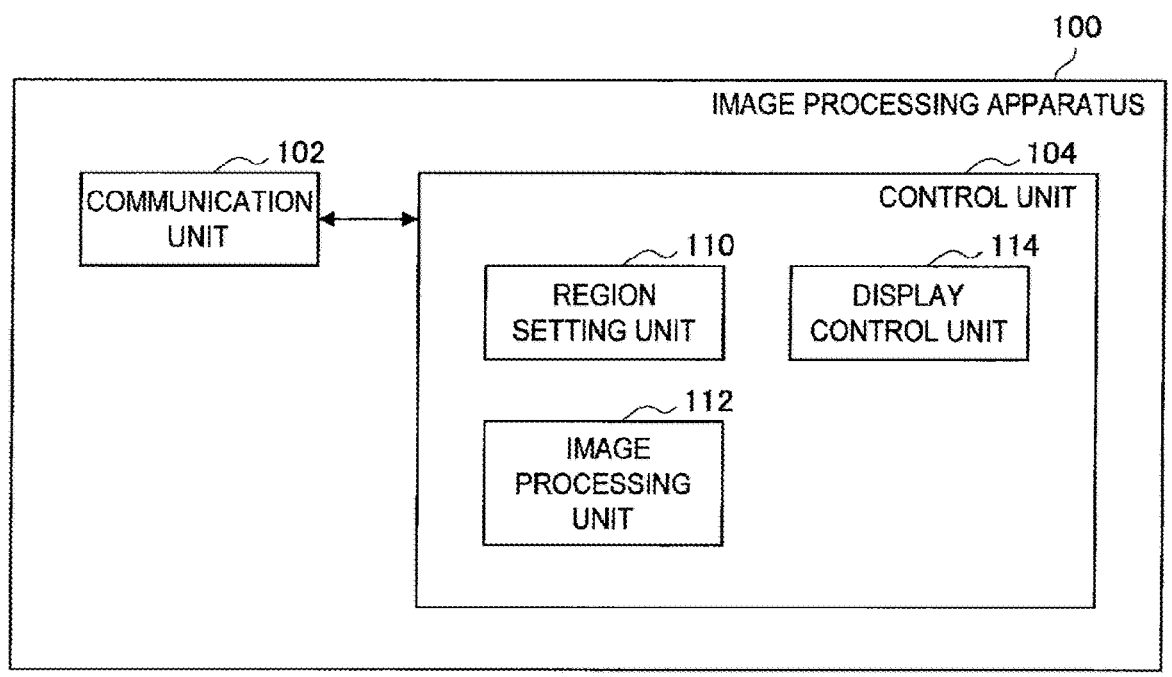

[Fig. 24]
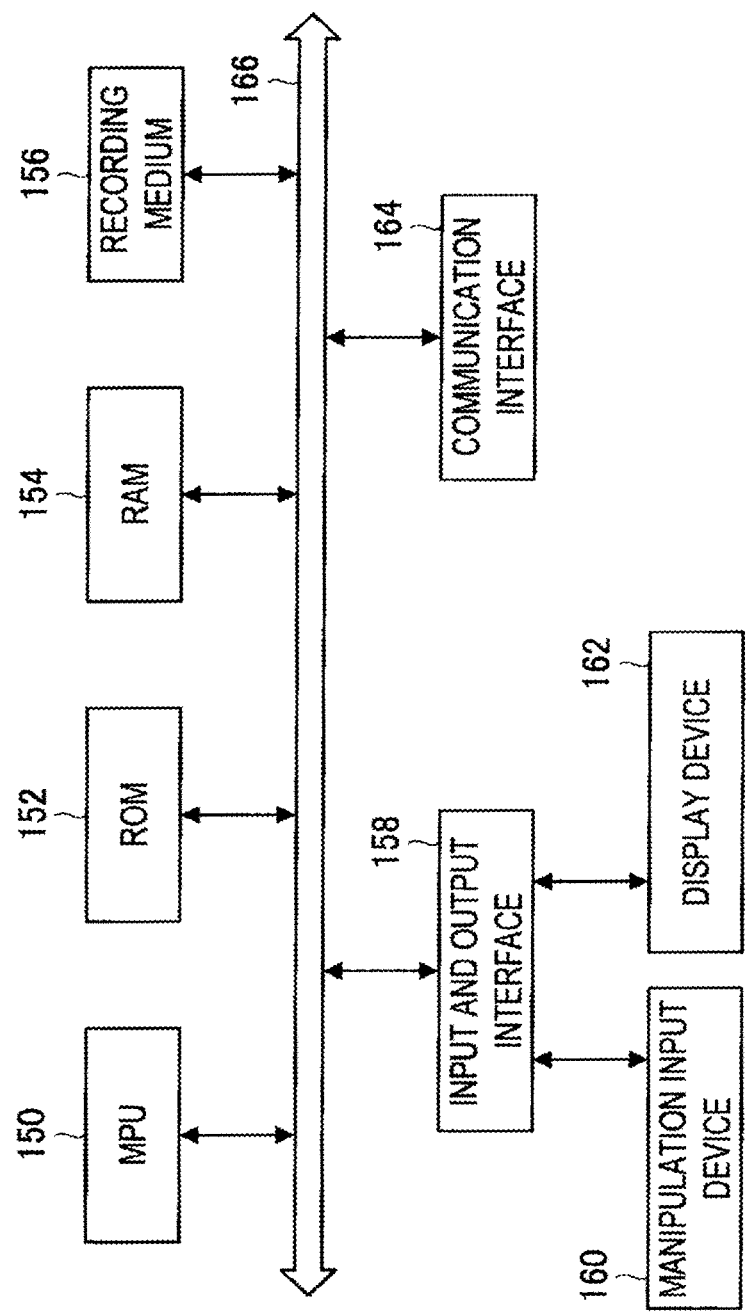

0
IMAGE PROCESSING APPARATUS, IMAGE PROCESSING METHOD, AND PROGRAM PRODUCT TO CONTROL A DISPLAY TO DISPLAY AN IMAGE GENERATED BASED ON A MANIPULATION TARGET IMAGE

This application is a continuation of U.S. application Ser. No. 15/337,029, filed Oct. 28, 2016, which is a continuation of U.S. application Ser. No. 14/380,812, filed Aug. 25, 2014, which is a national stage of International Application No. PCT/JP13/03116, filed May 16, 2013, and claims the benefit of priority from Japanese Patent Application No. 2012-133786, filed Jun. 13, 2012, the entire contents of which each are incorporated herein by reference.

TECHNOLOGY FIELD

The present disclosure relates to an image processing apparatus, an image processing method, and a program.

BACKGROUND ART

In recent years, higher functionality or multi-functionality of devices such as electronic devices is progressing more and more, and content of instructions that has to be given to a device for a user to use the device is more diversified and complicated. Under these circumstances, in many devices, a GUI (Graphical User Interface) is adopted as a user interface, and enables a user to give instructions to the device more easily than when using a device with a CUI (Character User Interface). However, for example, for users who are not familiar with a manipulation using a pointing device such as a mouse, the GUI whose manipulation is performed using the pointing device is not necessarily a user interface with excellent maneuverability.

Under these circumstances, technology related to a user interface for improving maneuverability has been developed. An example of technology for displaying, on a display screen, an image in which a captured image and an object image related to an object associated with a predetermined event are combined may include technology described in PTL 1.

CITATION LIST

Patent Literature

PTL 1: Japanese Patent Application Laid-Open No. 2005-216061

SUMMARY

Technical Problem

An image in which a captured image (a mirror image based on a captured image; the same applies hereinafter) and an object image related to an object associated with a predetermined event are combined is displayed on a display screen, for example, as in a case in which the technology described in PTL 1 is used, making it possible to feed a gesture operation of a user back to the user.

However, for example, the technology described in PTL 1 is intended to change a position in which the object image is combined according to a position of the user detected from the captured image. Accordingly, for example, when a manipulation target image including an object that is a manipulation target that can be manipulated by the user (hereinafter referred to as "manipulation target object"), such as a button or an icon, like a web page and the captured image are combined, it is difficult to apply, for example, the technology described in PTL 1. Thus, for example, a process related to the technology described in PTL 1 is not necessarily a gesture recognition-conscious process.

In the present disclosure, a new and improved image processing apparatus, image processing method, and program capable of displaying a captured image and a manipulation target image on a display screen while preventing degradation of maneuverability of a user are proposed.

Solution to Problem

According to an embodiment of the present disclosure, there is provided an information processing system including: circuitry configured to: control a display to display an image generated based on a manipulation target image and an image based on a manipulation target region that is set based on a detection of an object included in acquired image data.

Further, according to another embodiment of the present disclosure, there is provided a method performed by an information processing system, the method including: controlling a display to display an image generated based on a manipulation target image and an image based on a manipulation target region that is set based on a detection of an object included in acquired image data.

Further, according to the embodiment of the present disclosure, there is provided a non-transitory computer-readable medium including computer-program instructions, which when executed by an information processing system, cause the information processing system to: control a display to display an image generated based on a manipulation target image and an image based on a manipulation target region that is set based on a detection of an object included in acquired image data.

Advantageous Effects of Invention

According to the embodiment of the present disclosure, it is possible to display the captured image and the manipulation target image on the display screen while preventing degradation of the maneuverability of the user.

BRIEF DESCRIPTION OF DRAWINGS

FIG. 1 is an illustrative diagram illustrating an example of a region setting process according to the present embodiment.

FIG. 2 is an illustrative diagram illustrating an example of a region setting process according to the present embodiment.

FIG. 3 is an illustrative diagram illustrating an example of a region setting process according to the present embodiment.

FIG. 4 is an illustrative diagram illustrating an example of a region setting process according to the present embodiment.

FIG. 5 is an illustrative diagram illustrating an example of a manipulation target region set by an image processing apparatus according to the present embodiment.

FIG. 6 is an illustrative diagram illustrating an example of an effect of an image processing apparatus according to the present embodiment separately setting a display target region and a manipulation target region.

FIG. 7 is an illustrative diagram illustrating another example of the region setting process according to the present embodiment.

FIG. 8 is an illustrative diagram illustrating an example of a method of notifying a user that the user is closer to the outside of a range of recognition in a manipulation target region according to the present embodiment.

FIG. 9A is an illustrative diagram illustrating an example of a combined image to be displayed on a display screen by the image processing apparatus according to the present embodiment.

FIG. 9B is an illustrative diagram illustrating an example of a combined image to be displayed on a display screen by the image processing apparatus according to the present embodiment.

FIG. 10A is an illustrative diagram illustrating an example of a combined image to be displayed on a display screen by the image processing apparatus according to the present embodiment.

FIG. 10B is an illustrative diagram illustrating an example of a combined image to be displayed on a display screen by the image processing apparatus according to the present embodiment.

FIG. 11 is an illustrative diagram illustrating an example of a combined image to be displayed on a display screen by the image processing apparatus according to the present embodiment.

FIG. 12 is an illustrative diagram illustrating an example of a combined image to be displayed on a display screen by the image processing apparatus according to the present embodiment.

FIG. 13 is an illustrative diagram illustrating an example of a manipulation target image according to the present embodiment.

FIG. 14 is an illustrative diagram illustrating another example of image processing in the image processing apparatus according to the present embodiment.

FIG. 15 is an illustrative diagram illustrating an example of a predetermined region larger than a display target region according to the present embodiment.

FIG. 16 is an illustrative diagram illustrating another example of image processing in the image processing apparatus according to the present embodiment.

FIG. 17 is an illustrative diagram illustrating another example of image processing in the image processing apparatus according to the present embodiment.

FIG. 18 is an illustrative diagram illustrating another example of image processing in the image processing apparatus according to the present embodiment.

FIG. 19 is an illustrative diagram illustrating an example of a notification process in the image processing apparatus according to the present embodiment.

FIG. 20 is an illustrative diagram illustrating an example of a notification process in the image processing apparatus according to the present embodiment.

FIG. 21 is an illustrative diagram illustrating an example of a notification process in the image processing apparatus according to the present embodiment.

FIG. 22 is a flow diagram illustrating an example of a process according to an image processing method according to the present embodiment.

FIG. 23 is a block diagram illustrating an example of a configuration of the image processing apparatus according to the present embodiment.

FIG. 24 is an illustrative diagram illustrating an example of a hardware configuration of the image processing apparatus according to the present embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order:

1. Image processing method according to the present embodiment

2. Image processing apparatus according to the present embodiment

3. Program according to the present embodiment

Image Processing Method According to the Present Embodiment

An image processing method according to the present embodiment will be described prior to a description of a configuration of the image processing apparatus according to the present embodiment. Further, in the following description, it is assumed that the image processing apparatus according to the present embodiment performs a process according to the image processing method according to the present embodiment.

[1] Overview of Image Processing Method According to the Present Embodiment

As a method of displaying a captured image for feeding a gesture operation back to a user and a manipulation target image on a display screen, for example, a method for combining the captured image with the manipulation target image and displaying a resultant image on the display screen may be considered.

However, when the method of simply combining the captured image with the manipulation target image and displaying a resultant image on the display screen is used, for example, it may be difficult for the user to manipulate a manipulation target object arranged within the display screen. An example of a case in which it is difficult for the user to manipulate the manipulation target object arranged within the display screen may include a case in which a hand of the user does not reach the manipulation target object arranged at a screen edge of the display screen even when the user moves the hand. Thus, when the method of simply combining the captured image with the manipulation target image and displaying a resultant image on the display screen is used, the maneuverability of the user may be degraded.

Therefore, the image processing apparatus according to the present embodiment sets a manipulation target region in a part of the captured image (a region setting process). Further, the image processing apparatus according to the present embodiment combines an image of a region corresponding to the manipulation target region to be displayed on the display screen in the captured image (hereinafter referred to as a "display target region") with the manipulation target image (image processing). Also, the image processing apparatus according to the present embodiment displays a combined image on the display screen (a display control process).

Here, the captured image according to the present embodiment is, for example, an image obtained by performing mirror image processing (a horizontal inversion process) on an image captured by an external imaging apparatus or by an imaging unit (which will be described below) when the image processing apparatus according to the present embodiment includes the imaging unit (which will be described below). The captured image according to the present embodiment serves to feed a gesture operation back to a user. As the image with which the captured image has been combined is displayed on the display screen, a user can visually confirm, for example, content of his or her gesture, such as performing a manipulation of sliding his or her hand or pressing using the hand or performing an enlarging manipulation, a reducing manipulation or a moving manipulation using multiple fingers. Here, the mirror image processing may be performed by the image processing apparatus according to the present embodiment or may be performed by the external apparatus such as an imaging apparatus that has performed imaging. Further, an example of the captured image according to the present embodiment may include a moving image (or a plurality of still images). Hereinafter, a case in which the captured image according to the present embodiment is a moving image including a plurality of frame images will be described by way of example.

An example of the external imaging apparatus and the imaging unit (which will be described below) according to the present embodiment may include a camera capable of acquiring RGB luminance information, but the external imaging apparatus and the imaging unit (which will be described below) according to the present embodiment are not limited thereto. For example, the external imaging apparatus and the imaging unit (which will be described below) according to the present embodiment can be a special camera capable of acquiring depth information, such as a depth camera.

Further, the captured image according to the present embodiment is not limited to the image subjected to the mirror image processing (horizontal inversion processing). For example, if the mirror image is captured in the imaging apparatus or the imaging unit (which will be described below), the captured image according to the present embodiment may be the captured image itself.

Further, the manipulation target region according to the present embodiment is a region in the captured image set in a part of the captured image, and is a region in which gesture recognition is performed. Here, a process related to the gesture recognition may be performed by the image processing apparatus according to the present embodiment or may be performed by an apparatus external to the image processing apparatus according to the present embodiment.

Further, the manipulation target image according to the present embodiment, for example, is an image including a manipulation target object manipulated according to a result of gesture recognition according to a gesture manipulation of the user. Here, an example of the manipulation target image according to the present embodiment may include an image showing a web page or a menu screen and a manipulation screen for each device. Further, examples of the manipulation target object according to the present embodiment may include a button, an icon, and a link such as a hyperlink. Further, as described above, the process related to the gesture recognition may be performed by the image processing apparatus according to the present embodiment or may be performed by an apparatus external to the image processing apparatus according to the present embodiment.

Further, an example of a UI (User Interface; icon size, layout or the like) shown in the manipulation target image according to the present embodiment may include the same UI (i.e., a fixed UI) in a case of a manipulation by a gesture or sound and a case of a manipulation by an external manipulation device such as a remote controller or a manipulation by a GUI, the UI shown in the manipulation target image according to the present embodiment is not limited thereto. For example, in the manipulation target image according to the present embodiment, the UI may be different in the case of a manipulation by a gesture or sound and the case of a manipulation by an external manipulation device such as a remote controller. An example of a case in which the UI is different may include a case in which 4*4 icons are displayed in the case of a manipulation by an external manipulation device such as a remote controller and 2*2 or 3*3 icons are displayed for easier manipulation in the case of a manipulation by a gesture or sound. Further, for example, in the case of the manipulation by a gesture, a manipulation target object for assisting in a gesture manipulation (e.g., a control panel) may be included in the manipulation target image according to the present embodiment.

Further, the display target region according to the present embodiment is a region corresponding to the manipulation target region set in a region setting process, which will be described below. An example of the display target region according to the present embodiment may include a region matching the manipulation target region, but the display target region according to the present embodiment is not limited thereto. For example, the display target region according to the present embodiment may be a region smaller than the manipulation target region. An example of a relationship between the manipulation target region and the display target region according to the present embodiment will be described below.

Further, an example of the display screen according to the present embodiment may include a display screen in an external display device or a display screen in a display unit (which will be described below) when the image processing apparatus according to the present embodiment includes the display unit (which will be described below).

The image processing apparatus according to the present embodiment performs, for example, (1) a region setting process, (2) image processing, and (3) a display control process, as processes according to the image processing method according to the present embodiment. Hereinafter, the processes according to the image processing method according to the present embodiment will be described in greater detail.

(1) Region Setting Process

The image processing apparatus according to the present embodiment sets the manipulation target region in a part of the captured image.

The image processing apparatus according to the present embodiment, for example, determines whether a start condition of gesture recognition (trigger of gesture recognition start) is satisfied, and sets the manipulation target region if it is determined that the start condition of gesture recognition is satisfied. Here, examples of the start condition of gesture recognition according to the present embodiment may include a predetermined gesture such as a hand gesture or hand holding being recognized, predetermined sound such as "Hello TV" being recognized, and a manipulation signal based on a start manipulation for gesture recognition (an example of the user manipulation), delivered from a manipulation unit (which will be described below) or an external manipulation device such as a remote controller, being detected. The image processing apparatus according to the present embodiment determines whether a predetermined gesture has been recognized, for example, based on a signal indicating a gesture recognition result (when the image processing apparatus according to the present embodiment has a gesture recognition function based on the captured image) or a gesture recognition result acquired from an external apparatus. Further, the image processing apparatus according to the present embodiment determines whether predetermined sound has been recognized, for example, based on a signal indicating a sound recognition result (when the image processing apparatus according to the present embodiment has a sound recognition function based on a sound signal) or a sound recognition result acquired from an external apparatus.

Further, if it is determined that a start condition of gesture recognition corresponding to a plurality of users has been satisfied, the image processing apparatus according to the present embodiment may set the manipulation target region, for example, according to a priority set for each user. Here, examples of a method of setting the priority may include a variety of methods, such as a method of setting a high priority for a first recognized user or a last recognized user or a method of setting a priority based on a user manipulation.

Further, the region setting process in the image processing apparatus according to the present embodiment is not limited to setting the manipulation target region if it is determined that the start condition of gesture recognition is satisfied. For example, the image processing apparatus according to the present embodiment may set a region that is a candidate for the manipulation target region regularly/irregularly. If the region that is a candidate for the manipulation target region is set regularly/irregularly, the image processing apparatus according to the present embodiment sets, as the manipulation target region, the most recently set region that is the candidate for the manipulation target region, for example, when it is determined that the start condition of gesture recognition is satisfied.

(1-1) First Example of Region Setting Process

The image processing apparatus according to the present embodiment sets, for example, a manipulation target region based on a position and a size of a detection target in a captured image.

FIG. 1 is an illustrative diagram illustrating an example of a region setting process according to the present embodiment. Here, FIG. 1 illustrates an example of a case in which the image processing apparatus according to the present embodiment sets a manipulation target region using a hand of a user as a detection target. Further, A shown in FIG. 1 illustrates an example of the captured image, and B shown in FIG. 1 illustrates an example of the manipulation target region to be set.

The image processing apparatus according to the present embodiment, for example, detects a location and a size of the hand from the captured image and sets the manipulation target region based on detection values of the detected position and size of the hand.

Here, the image processing apparatus according to the present embodiment, for example, identifies a region including the hand (an example of the detection target) based on a result of an edge detection process for the captured image or a result of a process of detecting a predetermined color, such as a skin color, for the captured image, to detect the position and the size of the hand from the captured image. Further, the process of detecting the position and the size of the hand in the image processing apparatus according to the present embodiment is not limited to the above process. For example, the image processing apparatus according to the present embodiment can detect the position and the size of the hand from the captured image through any process capable of detecting the position and the size of the hand.

Further, the image processing apparatus according to the present embodiment sets, for example, as the manipulation target region, a region having any size including the detected hand, which is smaller than the entire captured image.

Further, when the image processing apparatus according to the present embodiment detects the position and the size of the hand from the captured image to set the manipulation target region, a manipulation target region expected by a manipulator (a user) may be set outside an angle of view in an external imaging apparatus or imaging unit (which will be described below). The image processing apparatus according to the present embodiment determines whether the manipulation target region set based on the position and the size of the hand detected from the captured image is set outside of the view angle. If the manipulation target region is determined to be set outside the view angle, the image processing apparatus may set, for example, the manipulation target region in a position opposite in the horizontal direction to the detected hand (an position opposite to a position of the user).

FIG. 2 is an illustrative diagram illustrating an example of the region setting process according to the present embodiment. Here, FIG. 2 illustrates an example of the manipulation target region set when the image processing apparatus according to the present embodiment determines whether the manipulation target region is outside the view angle. Further, FIG. 2 illustrates an example of the captured image.

When the manipulation target region set based on the location and the size of the hand detected from the captured image is set outside the angle of view, for example, as shown in A of FIG. 2, the image processing apparatus according to the present embodiment sets the manipulation target region in a position opposite in the horizontal direction to the detected hand, as shown in B of FIG. 2.

The image processing apparatus according to the present embodiment sets, for example, the manipulation target region based on the position and size of the hand in the captured image, as described above. Further, the detection target whose position and size are detected by the image processing apparatus according to the present embodiment is not limited to the hand of the user, for example, as shown in FIG. 1. For example, the image processing apparatus according to the present embodiment may detect a position and size of a face of the user and set the manipulation target region based on detection values of the detected position and size of the face.

Here, the image processing apparatus according to the present embodiment detects, for example, the position and size of the face from the captured image by performing any face detection process, such as a detection method based on brightness in the captured image.

Further, the image processing apparatus according to the present embodiment, for example, sets a region smaller than the entire captured image as the manipulation target region based on the detection values of the detected position and size of the face. Here, the image processing apparatus according to the present embodiment sets, for example, as the manipulation target region, a region having any size including the detected face, which is smaller than the entire captured image.

Further, the manipulation target region to be set when the image processing apparatus according to the present embodiment detects the position and size of the face is not limited to the above manipulation target region. For example, the image processing apparatus according to the present embodiment may set, as the manipulation target region, a region obtained by shifting, in a horizontal direction, a region having any size including the detected face according to the handedness of the user corresponding to the detected face. The image processing apparatus according to the present embodiment, for example, sets the manipulation target region in a position corresponding to the handedness of the user corresponding to the detected face, based on handedness information (data) indicating the handedness of the user corresponding to the detected face. Here, the handedness information according to the present embodiment is stored for each user in a recording medium such as a storage unit (which will be described below), for example, based on a registration manipulation of the user (an example of the user manipulation). Further, the image processing apparatus according to the present embodiment reads the handedness information corresponding to the user corresponding to the detected face, for example, from the storage unit (which will be described below) by identifying the user corresponding to the face detected using face recognition technology. Also, the image processing apparatus according to the present embodiment sets the manipulation target region based on the read handedness information.

The image processing apparatus according to the present embodiment sets the manipulation target region by detecting, as the detection target, one part of the user such as the hand or the face of the user, for example, as described above. Further, the detection target whose position and size are detected by the image processing apparatus according to the present embodiment is not limited to one part of the user, such as the hand or the face of the user. For example, the image processing apparatus according to the present embodiment may set the manipulation target region by detecting a plurality of parts of the user as the detection targets.

For example, the image processing apparatus according to the present embodiment detects the position and size of the hand of the user and the position and the size of the face of the user, and sets the manipulation target region based on the detection values of the position and size of the detected hand and the detection values of the position and size of the detected face. FIG. 3 is an illustrative diagram illustrating an example of the region setting process according to the present embodiment. Here, FIG. 3 illustrates an example of a case in which the image processing apparatus according to the present embodiment sets the manipulation target region using the hand of the user and the face of the user as detection targets. Further, FIG. 3 illustrates an example of the captured image.

When a captured image indicates that a user raises a right hand, for example, as shown in FIG. 3, the image processing apparatus according to the present embodiment sets the manipulation target region on a right side of the detected face (a left side in a mirror image).

The image processing apparatus according to the present embodiment sets the manipulation target region, for example, based on the position and size of the detection target in the captured image, as described above. Here, as the image processing apparatus according to the present embodiment uses, for example, the hand or the face of the user as the detection target, a ratio of the set manipulation target region and the size of the face or hand of the user included in the manipulation target region is kept constant. Thus, as the image processing apparatus according to the present embodiment uses, for example, the hand or the face of the user as the detection target, the user is able to perform a manipulation with the similar manipulation feeling, for example, even when the user is in a position apart from an external imaging apparatus or imaging unit (which will be described below) or even when the user is in a position close to the external imaging apparatus or imaging unit (which will be described below).

(1-2) Second Example of Region Setting Process

The image processing apparatus according to the present embodiment sets the manipulation target region, for example, based on posture of the user detected from the captured image. The image processing apparatus according to the present embodiment obtains skeleton information (data) of the user using a process according to any posture estimation technology, such as estimating the posture of the user based on estimation of a part of the user using, for example, machine learning. Also, the image processing apparatus according to the present embodiment sets the manipulation target region by estimating an operating range of the user from the skeleton information.

Further, the process of setting the manipulation target region based on the posture of the user in the image processing apparatus according to the present embodiment is not limited to the above process. For example, the image processing apparatus according to the present embodiment may further detect the position and size of the face of the user and set the manipulation target region based on the estimation result for the posture of the user and detection values of the detected position and size of the face.

FIG. 4 is an illustrative diagram illustrating an example of the region setting process according to the present embodiment. Here, FIG. 4 illustrates an example of a case in which the image processing apparatus according to the present embodiment sets the manipulation target region based on the estimation result for the posture of the user and the detection values of the position and size of the detected face. Further, FIG. 4 illustrates an example of the captured image.

For example, if an extremely tilted face is detected when the user assumes a reclining posture as shown in FIG. 4, the image processing apparatus according to the present embodiment estimates a driving range of the hand of the user to set the manipulation target region. For example, in the example of FIG. 4, an example in which the manipulation target region is set in an upward direction of the detected face (upward in a vertical direction), rather than the manipulation target region being set in a position shifted in a horizontal direction from the detected face, is illustrated.

Further, the image processing apparatus according to the present embodiment may fix a manipulation target region that has been once set, or may dynamically change a manipulation target region according to a movement of the face, the hand or the like of the user to be detected from the captured image.

(1-3) Third Example of Region Setting Process

The image processing apparatus according to the present embodiment sets the manipulation target region, for example, based on the motion of the detection target.

For example, the image processing apparatus according to the present embodiment detects a predetermined gesture, such as a hand gesture such as waving goodbye or drawing any shape in the air, and sets a region including a movement region of a hand performing the gesture (an example of the detection target) as the manipulation target region. Further, the detection target detected by the image processing apparatus according to the present embodiment is not limited to a part of the user, such as the hand of the user. For example, the image processing apparatus according to the present embodiment may set, as the manipulation target region, a region including a movement region of a predetermined device, such as a rod-like device that the user has in his or her hand.

(1-4) Fourth Example of Region Setting Process

The image processing apparatus according to the present embodiment sets the manipulation target region, for example, based on a shape of the detection target and a size of the manipulation target object included in a manipulation target image.

For example, in a case in which an object of a target on which gesture recognition is performed (which may be hereinafter referred to as a "recognition target object") is the hand of the user, when the size of the hand of the user included in the set manipulation target region is much larger than an icon included in the manipulation target image (an example of the manipulation target object), it may be difficult for the user to perform a desired manipulation using the hand. An example of a case in which it is difficult to perform a desired manipulation using the hand may include a case in which the user does not know where the user is pointing when selecting content, for example, by a par. Further, the user does not know where the user is pointing in cases other than the case in which the user selects the content by a par, and, for example, the user may not know where the user is pointing when the user selects content with a fingertip.

Therefore, the image processing apparatus according to the present embodiment sets the manipulation target region, for example, so that a difference between the size of the detection target and the size of the manipulation target object is within a predetermined range, based on the shape of the detection target with which the user performs a manipulation and the size of the manipulation target object. For example, the image processing apparatus according to the present embodiment sets the manipulation target region so that the size of the detection target and the size of the manipulation target object are approximately the same. Here, the predetermined range according to the present embodiment described above may be a fixed value that has been set in advance or may a variable value that can be changed, for example, by the user.

(1-5) Fifth Example of Region Setting Process

For example, the image processing apparatus according to the present embodiment may set the manipulation target region by combining a plurality of processes that can be combined among the first example of the region setting process to the fourth example of the region setting process, such as the first example of the region setting process and the second example of the region setting process, the first example of the region setting process and the third example of the region setting process, and the first example of the region setting process and the fourth example of the region setting process.

(1-6) Sixth Example of Region Setting Process

The image processing apparatus according to the present embodiment, for example, sets the manipulation target region based on one or two or more of the position and size of the detection target in the captured image, the motion of the detection target, the posture of the user, the shape of the detection target, and the size of the manipulation target object included in the manipulation target image, as described above. Here, the image processing apparatus according to the present embodiment, for example, sets a region that matches a display target region according to the present embodiment as the manipulation target region, but the manipulation target region set by the image processing apparatus according to the present embodiment is not limited to the region. For example, the image processing apparatus according to the present embodiment may set, as the manipulation target region, a region smaller than the entire captured image region and larger than the display target region.

As a specific example, the image processing apparatus according to the present embodiment calculates values related to the display target region using, for example, the following Math. 1 to Math. 4. Further, the following Math. 1 to Math. 4 show an example of calculation of the values related to the display target region when the display target region is a rectangular region. Here, "vw" shown in Math. 1 indicates a width in a horizontal direction of the display target region, and "fw" shown in Math. 1 indicates a width (a known value) in a horizontal direction of a rectangular region in which a face has been recognized in the captured image. Further, "magnification ratio of visual feedback" shown in Math. 1 is a value to be set. Further, "vh" shown in Math. 2 indicates a width in a vertical direction of the display target region, and "height ratio" shown in Math. 2 indicates a vertical width of the display screen/a horizontal width of the display screen (a known value; for example, height ratio=9/16 in the case of a 16:9 screen). Further, "vx" shown in Math. 3 indicates an x coordinate of an upper left corner of the display target region (a rectangular region), and "fcx" shown in Math. 3 indicates an x coordinate (a known value) of a center of the rectangular region in which the face has been recognized in the captured image. Further, "offset value in x direction" shown in Math. 3 is a value to be set. Further, "vy" shown in Math. 4 indicates a y coordinate of an upper left corner of the display target region (rectangular region), and "fcy" shown in Math. 4 indicates a y coordinate (a known value) of the center of the rectangular region in which the face has been recognized in the captured image. Further, "fh" shown in Math. 4 indicates a width (known value) in a vertical direction of the rectangular region in which the face has been recognized in the captured image, and "offset value in y direction" shown in Math. 4 is a value to be set. Further, "f" shown in Math. 3 and Math. 4 indicates a value to be set (one of the values 0 to 9).

$$vw = fw * (\text{magnification ratio of visual feedback}) \quad (\text{Math. 1})$$

$$vh = vw * \text{height ratio} \quad (\text{Math. 2})$$

$$vx = fcx + fw * (\text{offset value in } x \text{ direction}) - vw/2 \cdot f \quad (\text{Math. 3})$$

$$vy = fcy + fh * (\text{offset value in } y \text{ direction}) - vh/2 \cdot f \quad (\text{Math. 4})$$

Further, the image processing apparatus according to the present embodiment calculates values related to the manipulation target region, for example, using the following Math. 5 to Math. 8. Further, the following Math. 5 to Math. 8 show an example of calculation of the values related to the manipulation target region when the manipulation target region is a rectangular region. Here, "rw" shown in Math. 5 indicates a width in a horizontal direction of the manipulation target region, and "hw" shown in Math. 5 indicates a width (a known value) in a horizontal direction of the rectangular region in which the hand has been recognized in the captured image. Further, "scaling ratio of width in horizontal direction" shown in Math. 5 is a parameter indicating a surplus with which a recognition range expands based on a size of the hand recognized in the captured image and is a value to be set. Further, "rh" shown in Math. 6 indicates a width in the vertical direction of the manipulation target region and "hh" shown in Math. 6 indicates a width (a known value) in the vertical direction of the rectangular region in which the hand has been recognized in the captured image. Further, "scaling ratio of width in vertical direction" shown in Math. 6 indicates a parameter indicating a surplus with which a recognition range expands based on a size of the hand recognized in the captured image and is a value to be set. Further, "rx" shown in Math. 7 indicates an x coordinate of an upper left corner of the manipulation target region (the rectangular region). Further, "ry" shown in Math. 8 indicates a y coordinate of the upper left corner of the manipulation target region (the rectangular region).

$$rw=vw+hw*(\text{scaling ratio of width in horizontal direction}) \quad \text{(Math. 5)}$$

$$rh=vw+hh*(\text{scaling ratio of width in vertical direction}) \quad \text{(Math. 6)}$$

$$rx=vx+vw/2-rw/2 \quad \text{(Math. 7)}$$

$$ry=vy+vh/2-rh/2 \quad \text{(Math. 8)}$$

The image processing apparatus according to the present embodiment sets the display target region, for example, by calculating the values related to the display target region using Math. 1 to Math. 4 described above. Further, the image processing apparatus according to the present embodiment sets a region smaller than the region of the entire captured image and larger than the display target region as the manipulation target region, for example, by calculating the values related to the manipulation target region using Math. 5 to Math. 8 described above. Further, it is understood that the process related to the setting of the manipulation target region smaller than the region of the entire captured image and larger than the display target region according to the present embodiment is not limited to the above process.

FIG. 5 is an illustrative diagram illustrating an example of the manipulation target region set by the image processing apparatus according to the present embodiment. Here, A shown in FIG. 5 indicates a captured image. Further, B shown in FIG. 5 indicates an example of the display target region according to the present embodiment, and C shown in FIG. 5 indicates an example of the manipulation target region according to the present embodiment.

As shown in FIG. 5, the image processing apparatus according to the present embodiment sets a region smaller than the region of the entire captured image (A shown in FIG. 5) and larger than the display target region (B shown in FIG. 5) as the manipulation target region (C shown in FIG. 5). As the image processing apparatus according to the present embodiment separately sets the display target region that is a region displayed on the display screen and the manipulation target region that is a region in which the gesture recognition is performed as shown in FIG. 5, for example, effects shown in (a) and (b) are obtained.

(a) Even when the user has conducted a gesture outside the display target region displayed on the display screen, the apparatus that performs a process related to gesture recognition (the image processing apparatus according to the present embodiment and/or an external apparatus; the same applies hereinafter) can recognize the gesture.

(b) Through (a), for example, the following manipulations using regions of edges in the display target region displayed on the display screen are realized:

A selection manipulation to select manipulation target objects present in the regions of edges at a top and bottom of the screen and at a left and right of the screen An auto scroll manipulation to cause a movement of a portion of an image displayed on the display screen (e.g., only a specific manipulation target object) or transition to another image by moving the hand to the vicinity of the edge of the screen A scroll manipulation to cause a movement of a portion of an image displayed on the display screen (e.g., only a manipulation target object) or transition to another image through a gesture of striking (touching) the vicinity of the edge of the screen (an example of the gesture).

FIG. 6 is an illustrative diagram illustrating an example of an effect of the image processing apparatus according to the present embodiment separately setting the display target region and the manipulation target region. Here, in FIG. 6, only the manipulation target image rather than an image in which an image in the display target region and the manipulation target image in the captured image are combined by image processing according to the present embodiment that will be described below is illustrated for convenience of description. Further, AR1 shown in FIG. 6 indicates a region corresponding to the display target region. Further, AR2 shown in FIG. 6 indicates a region corresponding to a partial region in the manipulation target region, and a part of the region AR2 is not included in the region AR1, as shown in FIG. 6.

For example, when the user (manipulator) moves the hand to the region AR2 shown in FIG. 6 (an example of a region near the edge of the screen), the apparatus that performs a process related to gesture recognition, for example, recognizes that an auto scroll manipulation has been performed. Also, if it is recognized that the auto scroll manipulation has been performed, the apparatus that performs a process related to gesture recognition, for example, moves "TV," "Web Browser," "Media Player," . . . , "Help Guide" that are manipulation target objects included in the manipulation target image illustrated in FIG. 6, in a direction M shown in FIG. 6 (an example of a case in which a portion of an image displayed on the display screen is moved). As the manipulation target objects included in the manipulation target image shown in FIG. 6 are moved in the direction M shown in FIG. 6, for example, other manipulation target objects are displayed on the display screen. Further, a change in the image displayed on the display screen when it is recognized that the auto-scroll manipulation has been performed is not limited to the example shown above. For example, if it is recognized that the auto scroll manipulation has been performed, the apparatus that performs a process related to gesture recognition may move the entire manipulation target image shown in FIG. 6 in the direction M shown in FIG. 6 and cause the image displayed on the display screen to transition from the manipulation target image shown in FIG. 6 to the other manipulation target image (an example of a case in which the image displayed on the display screen transitions). As the manipulation target image shown in FIG. 6 is moved in the direction M shown in FIG. 6 and caused to transition to the other manipulation target image, a manipulation target image different from the manipulation target image shown in FIG. 6 is displayed on the display screen.

Further, for example, if the user (manipulator) performs a gesture of striking (touching) the region AR2 shown in FIG. 6 (an example of the region near the edge of the screen), the apparatus that performs a process related to gesture recognition recognizes, for example, that a scroll manipulation has been performed. Also, if it is recognized that the scroll manipulation has been performed, the apparatus that performs a process related to gesture recognition, for example, moves a specific manipulation target object included in the manipulation target image shown in FIG. 6 or the entire manipulation target image in the direction M shown in FIG. 6, as in the case in which it is recognized that the auto scroll manipulation has been performed.

As the image processing apparatus according to the present embodiment separately sets the display target region and the manipulation target region, the apparatus that performs a process related to gesture recognition can recognize the user manipulation, for example, in the region including the region not included in the display target region (the region AR1), as shown in the region AR2 shown in FIG. 6, and perform the process according to the recognized user manipulation. Thus, as the image processing apparatus according to the present embodiment separately sets the display target region and the manipulation target region, it is possible to further improve maneuverability of the user.

(1-7) Other Examples of Region Setting Process

Further, the region setting process in the image processing apparatus according to the present embodiment is not limited to each of the above-described processes. For example, when the manipulation target region is updated according to the position of the face or the hand, the user may move out of a range of recognition (e.g., outside an angle of view of a camera). Here, if the user moves out of the range of the recognition, it is difficult for the apparatus that performs a process related to gesture recognition to recognize a gesture and perform the process even when the user performs the gesture. Therefore, the image processing apparatus according to the present embodiment notifies the user that the user is out of the range of recognition.

FIG. 7 is an illustrative diagram illustrating another example of the region setting process according to the present embodiment. Here, each of A1, B1, C1, D1, and E1 shown in FIG. 7 illustrates a captured image and a manipulation target region set in the captured image. Further, A2 shown in FIG. 7 illustrates an image of a display target region corresponding to the manipulation target region shown in A1 of FIG. 7. Similarly, B2, C2, D2 and E2 shown in FIG. 7 illustrate images of display target regions corresponding to the manipulation target regions shown in B1, C1, D1, and E1 of FIG. 7, respectively. Further, FIG. 7 illustrates a change in a position of the set manipulation target region in time series in order of A1 shown in FIG. 7, B1 shown in FIG. 7, C1 shown in FIG. 7, D1 shown in FIG. 7, and E1 shown in FIG. 7.

For example, as shown in FIG. 7, when the manipulation target region is close to the vicinity of an edge of a range of recognition (e.g., an angle of view of a camera), the image processing apparatus according to the present embodiment appropriately sets the manipulation target region to move in a direction away from the edge of the range of recognition through animation display as if the manipulation target region has bumped into a wall and then bounced off the wall. Further, for example, as shown in C1 and C2 of FIG. 7, the image processing apparatus according to the present embodiment notifies the user that the user is close to the outside of the range of recognition by sandwiching a black image in a region corresponding to the outside of the range of recognition in the manipulation target region. By appropriately setting the manipulation target region so that the animation display, for example, as shown in FIG. 7 is realized, the image processing apparatus according to the present embodiment can cause the user to intuitively recognize that the user is close to the outside of the range of recognition. Further, by appropriately setting the manipulation target region so that the animation display, for example, as shown in FIG. 7 is realized, the image processing apparatus according to the present embodiment can cause the user to intuitively recognize that the user is close to the outside of the range of recognition without performing warning display.

Further, the process for performing a notification related to the outside of the range of recognition in the image processing apparatus according to the present embodiment is not limited to the above process. For example, the image processing apparatus according to the present embodiment may notify the user that the user is close to the outside of the range of recognition by appropriately setting the manipulation target region so that another animation display such as animation display showing returning to a wall is realized. Further, a method of notifying the user that the user is closer to the outside of the range of recognition in the manipulation target region in the image processing apparatus according to the present embodiment is not limited to sandwiching the black region in the image corresponding to the outside of the range of recognition in the manipulation target region, for example, as shown in C2 of FIG. 7.

FIG. 8 is an illustrative diagram illustrating an example of a method of notifying a user that the user is closer to the outside of a range of recognition in the manipulation target region according to the present embodiment. For example, as shown in A and B of FIG. 8, the image processing apparatus according to the present embodiment may superimpose a word or a symbol indicating a warning on a black image sandwiched in a region corresponding to the outside of the range of recognition in the manipulation target region. Further, for example, as shown in C of FIG. 8, the image processing apparatus according to the present embodiment may sandwich an image other than the black image, such as an image with a wallpaper of an application or with an affordance indicating that it is difficult to go to an end any more, in the region corresponding to the outside of the range of recognition in the manipulation target region. Further, for example, as shown in D of FIG. 8, the image processing apparatus according to the present embodiment may superimpose a word or symbol indicating a warning on an image other than the black image sandwiched in a region corresponding to the outside of the range of recognition in the manipulation target region.

(2) Image Processing

The image processing apparatus according to the present embodiment combines an image corresponding to the display target region in the captured image with the manipulation target image.

Further, image processing in the image processing apparatus according to the present embodiment is not limited to simple combination of the image corresponding to the display target region in the captured image with the manipulation target image.

When the captured image and the manipulation target image are simply combined and displayed on the display screen, for example, content of the captured image (more strictly, content of the image corresponding to the display target region) is superimposed on the manipulation target object included in the manipulation target image, and accordingly, there is the possibility of decreasing the visibility of the manipulation target object. Therefore, in order to reduce the possibility of decreasing visibility of the manipulation target object as described above, the image processing apparatus according to the present embodiment can change the degree of visualization of the captured image, for example, based on the captured image or the manipulation target image, and combine an image corresponding to the display target region in the captured image whose degree of visualization has been changed, with the manipulation target image.

Here, an example of a change in the degree of visualization of the captured image according to the present embodiment may include changing the partial range to partially visualize the captured image or changing the degree of smoothing to smooth the captured image. Further, a change in the degree of visualization of the captured image according to the present embodiment is not limited to the above change. The image processing apparatus according to the present embodiment may change the degree of visualization of the captured image, for example, by performing a variety of image processing, such as posterization, mosaic, line drawing, or silhouette display, on the captured image. Further, an example of partial visualization of the captured image according to the present embodiment may include changing a degree of transparency of the captured image.

Hereinafter, an example of image processing according to the present embodiment will be described using a primary example of a case in which the image processing apparatus according to the present embodiment combines the image corresponding to the display target region in the captured image whose degree of visualization has been changed with the manipulation target image.

(2-1) First Example of Process According to Change in Partial Range

The image processing apparatus according to the present embodiment determines a partial range, for example, based on a predetermined target to be recognized from the captured image. Also, the image processing apparatus according to the present embodiment, for example, changes a degree of transparency of the captured image based on the determined partial range to partially visualize the captured image.

Here, an example of the predetermined target according to the present embodiment may include an object such as a face of a user or a hand of the user. The image processing apparatus according to the present embodiment, for example, detects a characteristic point such as an eye, a nose, a mouth, and a skeleton of the user or detects a region similar to a luminance distribution and a structure pattern of the face from the captured image to recognize a face region including the face of the user. Further, the image processing apparatus according to the present embodiment, for example, performs a variety of image processing, such as edge detection or pattern matching, on the captured image to recognize an object of a recognition target, such as a user's hand, from the captured image.

Further, a process of recognizing a predetermined target in the image processing apparatus according to the present embodiment is not limited to the above process. For example, the image processing apparatus according to the present embodiment may recognize a moving body as the predetermined target from the captured image and determine a region including the recognized moving body as the partial range. Here, the image processing apparatus according to the present embodiment detects the moving body, for example, by performing detection of a difference between an image corresponding to a current frame and an image corresponding to a previous frame or detection of a change in a motion vector, but a method of detecting the moving body is not limited thereto.

Hereinafter, an example of the process according to a change in the partial range according to the present embodiment will be described in greater detail using an example of a process in a case in which a face is recognized as a predetermined target.

When the face is recognized as the predetermined target, the image processing apparatus according to the present embodiment recognizes the face from the captured image and determines a portion other than the recognized face as the partial range.

FIGS. 9A, 9B, 10A, and 10B are illustrative diagrams illustrating an example of a combined image displayed in a display screen by the image processing apparatus according to the present embodiment. Here, FIG. 9A is a conceptual diagram of an actual example shown in FIG. 9B, and FIG. 10A is a conceptual diagram of an actual example shown in FIG. 10B. Further, FIGS. 9A, 9B, 10A, and 10B illustrate an example of the image when the image processing apparatus according to the present embodiment determines the portion other than the face recognized from the captured image, as the partial range.

The image processing apparatus according to the present embodiment, for example, realizes the visualization of the portion other than the recognized face by performing a process of applying translucent gradation from the recognized face region. Here, the image processing apparatus according to the present embodiment may dynamically change the degree of transparency when applying the translucent gradation, according to a background portion of the captured image (e.g., the portion other than the recognized face region).

The image processing apparatus according to the present embodiment, for example, detects a spatial frequency or tint in a background portion of the captured image and dynamically changes a transparency degree according to a detection result. For example, the image processing apparatus according to the present embodiment reduces the transparency degree as the detected spatial frequency is higher (as the image is more complex) or reduces the transparency degree as the detected tint is darker. For example, since the transparency degree is reduced as the detected spatial frequency is higher or the transparency degree is reduced as the detected tint is darker as described above, the image processing apparatus according to the present embodiment can further prevent a decrease in visibility of the manipulation target object included in the manipulation target image.

Further, a process of dynamically changing the degree of transparency in the image processing apparatus according to the present embodiment is not limited to the above process. For example, the image processing apparatus according to the present embodiment may identify a position of the manipulation target object from the manipulation target image (or data constituting the manipulation target image, such as HTML data or XML data) and reduce the degree of transparency on a region including the identified position. In other words, the image processing apparatus according to the present embodiment can also change a partial range in which the captured image is partially visualized by determining the partial range based on the manipulation target object included in the manipulation target image.

Here, the image processing apparatus according to the present embodiment may exclusively perform one of the process of changing the partial range based on the manipulation target object included in the manipulation target image and the process of changing the partial range based on the predetermined target recognized from the captured image or may perform both of the processes. Further, when the image processing apparatus according to the present embodiment performs both of the processes, the image processing apparatus may set a priority for each process, such as setting a priority for the process of changing the partial range based on the manipulation target object included in the manipulation target image to be higher.

For example, as described above, the image processing apparatus according to the present embodiment can prevent a decrease in visibility of the manipulation target object included in the manipulation target image by dynamically changing the degree of transparency based on the position of the manipulation target object.

Further, while FIGS. 9A to 10B illustrate the case in which one user is included in the captured image, a plurality of users may be included in the captured image according to the present embodiment. The image processing apparatus according to the present embodiment sets the manipulation target region, for example, when it is determined that a start condition of gesture recognition is satisfied in the process (1) (region setting process).

(2-2) Second Example of Process According to Change in the Partial Range

In the above description, the example in which the image processing apparatus according to the present embodiment, for example, determines the partial range based on the predetermined target recognized from the captured image and partially visualizes the captured image based on the determined partial range has been shown as the first example of the process according to the change in the partial range. However, the process according to the change in the partial range in the image processing apparatus according to the present embodiment is not limited to the above example. For example, the image processing apparatus according to the present embodiment can also change the partial range in which the captured image is partially visualized, by changing a display area of the captured image.

FIG. 11 is an illustrative diagram illustrating an example of a combined image displayed on a display screen by the image processing apparatus according to the present embodiment. Here, FIG. 11 illustrates an example in which the partial range in which the captured image is visualized is changed by applying a mask to the captured image.

The image processing apparatus according to the present embodiment reduces the display area of the captured image by applying a mask to the captured image and changes a partial range in which the captured image is visualized, for example, as shown in FIG. 11.

Further, the process in the image processing apparatus according to the present embodiment is not limited to the example shown in FIG. 11. For example, the example in which the image processing apparatus according to the present embodiment applies the uniform mask to the entire captured image is illustrated in FIG. 11, but the image processing apparatus according to the present embodiment may dynamically change, for example, a density, shape or the like of the mask. For example, the image processing apparatus according to the present embodiment may identify a position of the manipulation target object from the manipulation target image (or data constituting the manipulation target image, such as HTML data or XML data) and reduce the density of the mask on a region including the identified position or near the region. In other words, the image processing apparatus according to the present embodiment can also change a partial range in which the captured image is partially visualized, by determining the partial range based on the manipulation target object included in the manipulation target image.

For example, as described above, the image processing apparatus according to the present embodiment can further prevent a decrease in visibility of the manipulation target object included in the manipulation target image by dynamically changing the density, shape or the like of the mask based on the position of the manipulation target object.

(2-3) Process According to Change in Degree of Smoothing to Smooth Captured Image In the above description, the process according to a change in the partial range has been shown as the process according to the image processing method in the image processing apparatus according to the present embodiment, but the process according to the image processing method according to the present embodiment is not limited thereto. For example, the image processing apparatus according to the present embodiment may change the degree of smoothing to smooth the captured image, as the process of changing the degree of visualization.

FIG. 12 is an illustrative diagram illustrating an example of the combined image displayed on a display screen by the image processing apparatus according to the present embodiment. Here, FIG. 12 illustrates an example of an image obtained by giving a blur effect to the captured image by smoothing the captured image. Further, an example in which, for example, the manipulation target image including manipulation target objects such as "TV," "Web Browser," . . . , "Help Guide" and the image in the display target region have been combined is illustrated in FIG. 12.

The image processing apparatus according to the present embodiment gives the blur effect to the captured image, for example, by applying a Gaussian filter to the captured image. Further, the image processing apparatus according to the present embodiment may use any technology capable of giving the blur effect to the captured image.

Further, the image processing apparatus according to the present embodiment may combine the manipulation target object with the image in the display target region, for example, as shown in A of FIG. 12 or may not combine the manipulation target object with the image in the display target region, for example, as shown in B of FIG. 12. Here, FIG. 12 illustrates an example in which the image processing apparatus according to the present embodiment combines the manipulation target object with the image in the display target region so that the image in the display target region is represented with transparency. Whether the manipulation target object and the image in the display target region are combined as shown in A of FIG. 12 or the manipulation target object and the image in the display target region are not combined as shown in B of FIG. 12, the apparatus that performs a process related to gesture recognition recognizes a gesture manipulation with respect to the manipulation target object and performs a process associated with the manipulation target object. For example, if a user (a manipulator) performs a gesture of striking (touching) a desired manipulation target object by hand (an example of the gesture) on the desired manipulation target object, the apparatus that performs a process related to gesture recognition recognizes, for example, that an execution manipulation causing the apparatus that performs a process related to gesture recognition to execute a process corresponding to the manipulation target object has been performed. Also, when the execution manipulation is recognized to have been performed, the apparatus that performs a process related to gesture recognition performs, for example, a process associated with the manipulation target object of the target on which the execution manipulation has been performed.

The image processing apparatus according to the present embodiment selectively combines the manipulation target object included in the manipulation target image with the image in the display target region, for example, according to a type or an attribute of the manipulation target object included in the manipulation target image. The image processing apparatus according to the present embodiment can reduce the possibility of decreasing visibility of the manipulation target object, for example, by the combination, by selectively combining the manipulation target object included in the manipulation target image with the image in the display target region according to the type or attribute of the manipulation target object included in the manipulation target image.

Here, the image processing apparatus according to the present embodiment identifies a type or attribute of the manipulation target object based on meta-data corresponding to the manipulation target object or data constituting the manipulation target image (e.g., HTML data or XML data). Further, an example of a manipulation target object that the image processing apparatus according to the present embodiment does not combine with the image of the display target region may include a thumbnail or an icon indicating content (e.g., a thumbnail or an icon indicating a still image or a moving image) or a window indicating content being played (e.g., a playback window of a moving image). Further, an example in which both of a manipulation target object to be combined with the image of the display target region and a manipulation target object not combined with the image of the display target region are included in the manipulation target image is illustrated in FIG. 12, but the manipulation target image according to the present embodiment is not limited to the example shown in FIG. 12. For example, the manipulation target image according to the present embodiment may include only one of the manipulation target object to be combined with the image of the display target region and the manipulation target object not combined with the image of the display target region. Further, it is understood that an example of the manipulation target object not combined with the image of the display target region according to the present embodiment is not limited to the example shown above, and the image processing apparatus according to the embodiment can combine the thumbnail or the like indicating the content shown above with the image of the display target region.

Further, the object included in the manipulation target image that the image processing apparatus according to the present embodiment selectively combines with the image of the display target region is not limited to the manipulation target object included in the manipulation target image. For example, according to a type or an attribute of an object that is not the manipulation target object included in the manipulation target image (which may be hereinafter referred to as a "non-manipulation target object"), the image processing apparatus according to the present embodiment may selectively combine the non-manipulation target object included in the manipulation target image with the image of the display target region, as in a case in which the manipulation target object included in the manipulation target image is selectively combined. By selectively combining the non-manipulation target object included in the manipulation target image and the image of the display target region according to the type or the attribute of the non-manipulation target object included in the manipulation target image, the image processing apparatus according to the present embodiment, for example, can reduce the possibility of decreasing visibility of the non-manipulation target object by the combination. Here, an example of a non-manipulation target object that the image processing apparatus according to the present embodiment does not combine with the image of the display target region may include a text description window for content, which describes the content using text.

Further, an effect given to the captured image by the image processing apparatus according to the present embodiment smoothing the captured image is not limited to the blur effect. For example, as the image processing apparatus according to the present embodiment smooths the captured image, a painterly effect (e.g., a brush stroke effect) can be given to the captured image, as if it were painted by a painter.

If a painterly effect is given to the captured image, the image processing apparatus according to the present embodiment, for example, calculates a vector direction of an edge in the image (or an angle between the vector and a reference direction such as a vertical direction or a horizontal direction of the image) and adjusts intensity of an edge-preservation smoothing filter based on the vector direction. Also, the image processing apparatus according to the present embodiment smooths the captured image using the adjusted edge-preservation smoothing filter to give the painterly effect to the captured image. Here, an example of the edge-preservation smoothing filter according to the present embodiment may include a smoothing filter capable of preserving an edge, such as a bilateral filter. A process of giving the painterly effect to the captured image in the image processing apparatus according to the present embodiment is not limited to the above process. The image processing apparatus according to the present embodiment may use any technology capable of giving the painterly effect to the captured image.

The image processing apparatus according to the present embodiment performs, for example, any of the processes shown in (2-1) to (2-3) in the process (2) (image processing) to change the degree of visualization of the captured image and combines the image corresponding to the display target region in the captured image whose degree of visualization has been changed with the manipulation target image. Here, the image processing apparatus according to the present embodiment, for example, may perform a process defined in advance or may perform the process selected by the user.

Further, the process of combining the image corresponding to the display target region in the captured image whose degree of visualization has been changed with the manipulation target image in the process (2) (image processing) according to the present embodiment is not limited to the process shown in (2-1) to (2-3).

For example, a region in which a gesture can be recognized and a region in which a gesture is not recognized may be included in the manipulation target image according to the present embodiment. When the region in which a gesture can be recognized and the region in which a gesture is not recognized are included in the manipulation target image according to the present embodiment, the image processing apparatus according to the present embodiment, for example, may not combine the captured image in the region in which a gesture is not recognized in the manipulation target image.

FIG. 13 is an illustrative diagram illustrating an example of the manipulation target image according to the present embodiment. For example, a manipulation target object not suitable for a gesture manipulation (e.g., a manipulation target object that it is not easy to select by a gesture manipulation), such as fine links constituting menus as shown in A1 of FIG. 13 (an example of the manipulation target object), may be present in the manipulation target image according to the present embodiment. Further, for example, an object that is not a manipulation target object whose selection manipulation is performed as shown in A2 of FIG. 13 (a non-manipulation target object) may also be present in the manipulation target image according to the present embodiment. Therefore, in the present embodiment, for example, a region including manipulation target objects not suitable for a gesture manipulation as shown in A of FIG. 13 or a region including objects that are not manipulation target objects as shown in B of FIG. 13 is a region in which a gesture is not recognized in the manipulation target image. Further, for example, a region including manipulation target objects that can be manipulated by a gesture as shown in B of FIG. 13 in the manipulation target image is a region in which a gesture can be recognized in the manipulation target image.

Here, the image processing apparatus according to the present embodiment identifies the region in which a gesture is not recognized in the manipulation target image or the region in which a gesture can be recognized in the manipulation target image, for example, based on information indicating the region in which a gesture is not recognized in the manipulation target image associated with the manipulation target image (e.g., a meta data or a description of a tag in markup language). Further, a method of specifying the region in which a gesture is not recognized in the manipulation target image is not limited to the above method. For example, the image processing apparatus according to the present embodiment may analyze the manipulation target image and set each of the region in which a gesture can be recognized and the region in which a gesture is not recognized.

For example, in the example of FIG. 13, the image processing apparatus according to the present embodiment does not combine the captured image (or the captured image whose degree of visualization has been changed) in the regions shown in A1 and A2 of FIG. 13 and combines the captured image (or the captured image whose degree of visualization has been changed) in the region shown in B of FIG. 13. Here, in FIG. 13, an example in which the image processing apparatus according to the present embodiment has combined the captured image whose degree of visualization has been changed with the manipulation target image is simply illustrated.

The image processing apparatus according to the present embodiment combines the image corresponding to the display target region in the captured image with the manipulation target image in the process (2) (image processing). Also, the combined image is displayed on the display screen through a process (3) (display control process), which will be described below. Accordingly, as the image processing apparatus according to the present embodiment combines the image corresponding to the display target region with the manipulation target image in the process (2) (image processing), difficulty for the user in manipulating manipulation target objects arranged within the display screen is prevented.

Further, the image processing apparatus according to the present embodiment may change the degree of visualization of the captured image based on the captured image or the manipulation target image, and combine an image corresponding to the display target region in the captured image whose degree of visualization has been changed with the manipulation target image, for example, as described above. Also, the combined image is displayed on the display screen through a process (3) (display control process), which will be described below. Accordingly, as the image processing apparatus according to the present embodiment changes the degree of visualization of the captured image in the process (2) (image processing), it is possible to prevent the visibility of the manipulation target object from decreasing in comparison with the case in which the captured image and the manipulation target image are simply combined and displayed on the display screen.

Further, the process (2) (image processing) in the image processing apparatus according to the present embodiment is not limited to the above process.

(2-4) Other Examples of Image Processing (2-4-1) First Example of Other Image Processing For example, when the manipulation target region has been set in the process (1) (region setting process), the image processing apparatus according to the present embodiment may sequentially change the position and size of the region in the captured image to be combined with the manipulation target image from the position and size of a predetermined region larger than the display target region to the position and size of the display target region. When the position and size of the region in the captured image is changed, the image processing apparatus according to the present embodiment sequentially combines, for example, the image corresponding to the region whose position and size are sequentially changed with the manipulation target image.

As the image processing apparatus according to the present embodiment changes, for example, the position and size of the region in the captured image to be combined with the manipulation target image and sequentially combines the image corresponding to the region with the manipulation target image as described above, an image corresponding to a predetermined region is first displayed on the display screen and an image of animation display is displayed, such as zooming of the image corresponding to the predetermined region until the region corresponding to the display target region is displayed, through a process (3) (display control process), which will be described below.

Here, a situation in which there is a plurality of users in the captured image is assumed. In this situation, if an object that becomes a clue for identifying an individual, such as a face or clothing is not included in the image displayed on the display screen so that the user can identify the object, it may be difficult for each user to recognize a user whose gesture is currently recognized (in other words, where the manipulation target region is set) from the image displayed on the display screen.

On the other hand, the image processing apparatus according to the present embodiment displays, on the display screen, an image of animation display such as zooming of the image corresponding to the predetermined region up to the image corresponding to the display target region after the image corresponding to the predetermined region is first displayed. That is, each user views the image in the display target region corresponding to the manipulation target region after viewing an image that has been looked down at once. Thus, even when there are a plurality of users in the captured image, the image processing apparatus according to the present embodiment can enable each user to more easily recognize a user whose gesture is currently recognized (in other words, where the manipulation target region has been set) from the image displayed on display screen.

FIG. 14 is an illustrative diagram illustrating another example of the image processing in the image processing apparatus according to the present embodiment, and illustrates an example of animation display according to the present embodiment. Here, FIG. 14 shows an example of a captured image and an image to be displayed on the display screen (however, a manipulation target image is omitted) arranged in time series (arranged to the right as time elapses in FIG. 14). Further, in FIG. 14, a captured image A1 and an image A2 to be displayed on the display screen with the captured image are temporally corresponding images. Similarly, a captured image B1 and an image B2 to be displayed on the display screen with the captured image, a captured image C1 and an image C2 to be displayed on the display screen with the captured image, a captured image D1 and an image D2 to be displayed on the display screen with the captured image, and a captured image E1 and an image E2 to be displayed on the display screen with the captured image are temporally corresponding images. Further, in FIG. 14, the display target region is indicated by "AR_T" and the predetermined region is indicated by "AR0." Further, in FIG. 14, the region whose position and size are sequentially changed is indicated by "AR1."

Referring to FIG. 14, the image processing apparatus according to the present embodiment does not display an image for feedback on the display screen before a gesture manipulation starts (A2 shown in FIG. 14). In the process (1) (region setting process), if it is determined that a start condition of gesture recognition, such as waving goodbye is satisfied (if a gesture recognition start trigger (T shown in FIG. 14) is detected), the image processing apparatus according to the present embodiment displays the image corresponding to the predetermined region AR0 on the display screen. Here, although the example in which the predetermined region AR0 is the entire captured image is illustrated in FIG. 14, the predetermined region larger than the display target region according to the present embodiment is not limited to the above region.

FIG. 15 is an illustrative diagram illustrating an example of the predetermined region larger than the display target region according to the present embodiment. As shown in FIG. 15, the image processing apparatus according to the present embodiment may, for example, set a rectangular region having any size greater than a display target region including a face region of a user detected from a captured image as the predetermined region from which zooming starts.

An example of animation display according to another example of the image processing in the image processing apparatus according to the present embodiment will be described with reference to FIG. 14 again. When an image corresponding to the predetermined region AR0 is displayed on the display screen, the image processing apparatus according to the present embodiment sequentially changes, over time, the position and size of the region in the captured image to be combined with the manipulation target image from the position and size of the predetermined region AR0 to the position and size of the display target region AR_T (C1, D1, and E1 shown in FIG. 14). Thus, an image zoomed to the display target region AR_T will be displayed on the display screen over time, as shown in C2 of FIG. 14 to E2 of FIG. 14.

Here, the apparatus that performs a process related to gesture recognition performs the process related to the gesture recognition for the manipulation target region even while zooming, for example, as shown in FIG. 14, but the process in the apparatus that performs a process related to gesture recognition is not limited to the above process. For example, the apparatus that performs a process related to gesture recognition may not perform the process related to the gesture recognition while zooming as shown in FIG. 14. As the apparatus that performs a process related to gesture recognition does not perform the process related to the gesture recognition while zooming as shown in FIG. 14, it is possible to prevent a wrong manipulation of the user when it is difficult for the user to recognize the manipulation target region.

When the manipulation target region has been set in the process (1) (region setting process), the image processing apparatus according to the present embodiment displays, on the display screen, an image of animation display such as zooming of the image corresponding to the predetermined region up to the image corresponding to the display target region after the image corresponding to the predetermined region is first displayed, for example, as shown in FIG. 14. Thus, each user can recognize who is a manipulator, from the image displayed on the display screen.

(2-4-2) Second Example of Other Image Processing

Further, image processing when the manipulation target region has been set in the process (1) (region setting process) is not limited to the process when the manipulation target region has been newly set, for example as shown in FIG. 14. For example, the manipulation target region may have already been set when the manipulation target region was set in the process (1) (region setting process).

When a new manipulation target region different from the manipulation target region that has already been set in the process (1) (region setting process) has been set, the image processing apparatus according to the present embodiment, for example, may sequentially change the position and size of the region in the captured image to be combined with the manipulation target image from the position and size of the display target region corresponding to the manipulation target region that has already been set to the position and size of a predetermined region larger than the display target region. Further, when the position and size of the region in the captured image has been changed to the position and size of the predetermined region, the image processing apparatus according to the present embodiment, for example, sequentially changes the position and size of the region in the captured image from the position and size of the predetermined region to the position and size of the display target region corresponding to the newly set manipulation target region. When the position and size of the region in the captured image are changed, the image processing apparatus according to the present embodiment, for example, sequentially combines the image corresponding to the region whose position and size are sequentially changed with the manipulation target image.

As the image processing apparatus according to the present embodiment changes the position and size of the region in the captured image to be combined with the manipulation target image, for example, as described above and sequentially combines an image corresponding to the region with the manipulation target image, an image displayed on the display screen through a process (3) (display control process), which will be described below is an image of animation display, for example, as shown in the following (i) and (ii).

(i) Animation display, such as zooming, of an image corresponding to the display target region corresponding to the manipulation target region that has already been set, until an image corresponding to a predetermined region is displayed (zoom-out display)

(ii) Animation display, such as zooming, of the image corresponding to the predetermined region until the image corresponding to the display target region is displayed (zoom-in display)

Here, a situation in which there are a plurality of users in the captured image is assumed. In the above situation, if a display target region to be displayed on the display screen is instantaneously switched from a display target region corresponding to a manipulation target region set for one user to a display target region corresponding to a manipulation target region set for the other user, each user is likely to be unable to recognize a user whose gesture is currently recognized (in other words, where the manipulation target region has been set) from the image displayed on the display screen.

On the other hand, the image processing apparatus according to the present embodiment first displays, on the display screen, an image of animation display, such as zooming of the image of the display target region corresponding to the manipulation target region that has already been set, up to the image of the predetermined region. Also, the image processing apparatus according to the present embodiment displays, on the display screen, an image of animation display, such as zooming of the image of the predetermined region up to the image corresponding to the display target region corresponding to the newly set manipulation target region. That is, each user views the image of the display target region corresponding to the newly set manipulation target region through zoom-in display after viewing an image that has been looked down at once through zoom-out display. Thus, even when there are a plurality of users in the captured image and a user corresponding to the set manipulation target region is switched, the image processing apparatus according to the present embodiment can enable each user to more easily recognize a user whose gesture is currently recognized (in other words, where the manipulation target region has been set) from the image displayed on the display screen.

FIG. 16 is an illustrative diagram illustrating another example of the image processing in the image processing apparatus according to the present embodiment, and illustrates an example of the animation display according to the present embodiment. Here, FIG. 16 illustrates an example of a captured image and an image displayed on the display screen (however, the manipulation target image is omitted) arranged in time series (in FIG. 16, arranged to the right as time elapses). Further, in FIG. 16, a captured image A1 and an image A2 displayed on the display screen with the captured image are temporally corresponding images. Similarly, a captured image B1 and an image B2 displayed on the display screen with the captured image, a captured image C1 and an image C2 displayed on the display screen with the captured image, a captured image D1 and an image D2 displayed on the display screen with the captured image, and a captured image E1 and an image E2 displayed on the display screen with the captured image are temporally corresponding images. Further, in FIG. 16, a display target region corresponding to the manipulation target region that has already been set is indicated by "AR_T1" and a display target region corresponding to the manipulation target region that has been newly set is indicated by "AR_T2." Further, in FIG. 16, the predetermined region is indicated by "AR0," and regions whose position and size are changed sequentially are indicated by "AR1" and "AR2."

If a new manipulation target region is set when the display target region AR_T1 has been displayed on the display screen (A1 and A2 shown in FIG. 16), the image processing apparatus according to the present embodiment sequentially changes a position and size of the region in the captured image to be combined with the manipulation target image from a position and a size of the display target region AR_T1 to a position and size of the predetermined region AR0 over time (B1 and C1 shown in FIG. 16). Thus, an image zoomed to the predetermined region AR0 over time is displayed on the display screen, as shown in B2 and C2 of FIG. 16. Here, although the example in which the predetermined region AR0 is the entire captured image has been illustrated in FIG. 16, a predetermined region larger than the display target region according to the present embodiment is not limited to the above region, as described above.

Further, if the position and size of the region in the captured image to be combined with the manipulation target image are changed to the position and size of the predetermined region AR0, the image processing apparatus according to the present embodiment sequentially changes a position and size of the region in the captured image to be combined with the manipulation target image from the position and size of the predetermined region AR0 to the position and size of the display target region AR_T2 over time (D1 and E1 shown in FIG. 16). Thus, an image zoomed to the display target region AR_T2 over time is displayed on the display screen, as shown in D2 and E2 of FIG. 16.

Here, the apparatus that performs a process related to gesture recognition performs the process related to the gesture recognition on the manipulation target region even while zooming, for example, as shown in FIG. 16, but the process in the apparatus that performs a process related to gesture recognition is not limited thereto. For example, the apparatus that performs a process related to gesture recognition may not perform the process related to the gesture during zooming as shown in FIG. 16, like during zooming as shown in FIG. 14.

FIG. 17 is an illustrative diagram illustrating another example of the image processing in the image processing apparatus according to the present embodiment. FIG. 17 illustrates an example of a change in a region of the captured image included in an image displayed on the display screen when animation display according to the present embodiment is performed. For example, as shown in FIG. 17, the image processing apparatus according to the present embodiment changes the region displayed on the display screen from the region of the entire captured image to realize, for example, animation display in which the animation display shown in (i) and the animation display shown in (ii) are combined.

If a new manipulation target region different from the manipulation target region that has already been set has been set in the process (1) (region setting process), the image processing apparatus according to the present embodiment displays, on the display screen, an image of animation display in which zoom-out display from the display target region corresponding to the manipulation target region that has already been set and zoom-in display to the display target region corresponding to the manipulation target region that has been newly set are combined, for example, as shown in FIG. 16. Therefore, each user can recognize a change in the manipulator from the image displayed on the display screen.

Further, the image processing apparatus according to the present embodiment may adjust the degree of visualization of the manipulation target image, for example, during the zooming animation display. An example of adjusting the degree of visualization of the manipulation target image in the image processing apparatus according to the present embodiment may include decreasing a degree of transparency of a GUI such as a widget. By lowering the degree of transparency of the GUI, the image processing apparatus according to the present embodiment can temporarily increase visibility of the image (a feedback image) of the region in the captured image to be combined with the manipulation target image and cause the user to more easily recognize switching of the manipulator. Further, the example of adjusting the degree of visualization of the manipulation target image in the image processing apparatus according to the present embodiment is not limited to the above example. For example, the image processing apparatus according to the present embodiment may not temporarily display a GUI such as a widget.

Further, for example, when the image processing apparatus according to the present embodiment changes the degree of visualization of the captured image, the image processing apparatus may adjust the degree of visualization of the captured image. An example of adjusting the degree of visualization of the captured image in the image processing apparatus according to the present embodiment may include weakening blur addition and subtraction of the captured image.

(2-4-3) Third Example of Other Image Processing

Further, image processing in a case in which the new manipulation target region different from the manipulation target region that has already been set in the process (1) (region setting process) has been set is not limited to the process related to realization of the animation display in which zoom-out display and zoom-in display are combined, for example, as shown in FIG. 16.

For example, if a new manipulation target region different from the manipulation target region that has already been set in the process (1) (region setting process) has been set, the image processing apparatus according to the present embodiment may change the location of the region in the captured image to be combined with the manipulation target image to move from the display target region corresponding to the manipulation target region that has already been set to the display target region corresponding to the newly set manipulation target region.

FIG. 18 is an illustrative diagram illustrating another example of the image processing in the image processing apparatus according to the present embodiment, and illustrates an example of a movement of a region displayed on the display screen according to the present embodiment. Here, FIG. 18 illustrates the captured image. Further, in FIG. 18, the display target region corresponding to the manipulation target region that has already been set is indicated by "AR_T1" and the display target region corresponding to the manipulation target region that has been newly set is indicated by "AR_T2." Further, in FIG. 18, a trajectory of the movement of the region is indicated by "L."

As shown in L of FIG. 18, the image processing apparatus according to the present embodiment, for example, changes the position of the region in the captured image to be combined with the manipulation target image to draw a trajectory passing through the face region recognized from the captured image. As the position of the region in the captured image to be combined with the manipulation target image is changed to draw the trajectory passing through the face region recognized from the captured image, for example, as shown in FIG. 18, display in which switching of a manipulator is highlighted is realized.

Further, a method of changing the position of the region in the captured image to be combined with the manipulation target image according to the present embodiment is not limited to the above method. For example, the image processing apparatus according to the present embodiment may change the position of the region in the captured image to be combined with the manipulation target image, to move, at the shortest distance, from the display target region corresponding to the manipulation target region that has already been set, to the display target region corresponding to the manipulation target region that has been newly set.

(3) Display Control Process

If the process (2) (image processing) is completed, the image processing apparatus according to the present embodiment displays the combined image on the display screen.

Here, when the image processing apparatus according to the present embodiment displays the image on a display screen of an external display device, the image processing apparatus according to the present embodiment transmits, for example, an image signal indicating the image to the display device to display the image on the display device. Further, when the image processing apparatus according to the present embodiment displays the image on a display screen of a display unit (which will be described below), the image processing apparatus according to the present embodiment delivers an image signal indicating the image to the display unit (which will be described below) to display the image.

The image processing apparatus according to the present embodiment performs, for example, the process (1) (region setting process), the process (2) (image processing), and the process (3) (display control process), as the processes according to the image processing method according to the present embodiment. In the process (1) (region setting process), the image processing apparatus according to the present embodiment sets the manipulation target region. Further, in the process (2) (image processing), the image processing apparatus according to the present embodiment combines the image corresponding to the display target region in the captured image (the region corresponding to the manipulation target region) with the manipulation target image. Also, the combined image is displayed on the display screen through the process (3) (display control process).

Here, since the image processing apparatus according to the present embodiment combines the image corresponding to the display target region corresponding to the set manipulation target region with the manipulation target image in the process (2) (image processing), difficulty for the user in manipulating manipulation target objects arranged within the display screen is prevented.

Accordingly, the image processing apparatus according to the present embodiment can display the captured image and the manipulation target image on the display screen while preventing degradation of the maneuverability of the user.

Further, the image processing apparatus according to the present embodiment may change the degree of visualization of the captured image in the process (2) (image processing). When the degree of visualization of the captured image is changed in the process (2) (image processing), the image processing apparatus according to the present embodiment can prevent a decrease in the visibility of the manipulation target object in comparison with the case in which the captured image and the manipulation target image are simply combined and displayed on the display screen. Accordingly, if the degree of visualization of the captured image is changed in the process (2) (image processing), the image processing apparatus according to the present embodiment can display the captured image and the manipulation target image on the display screen while preventing a decrease in the visibility of the manipulation target object and preventing degradation of maneuverability of the user.

Further, if the image processing apparatus according to the present embodiment determines the partial range in which the captured image is partially visualized, based on the manipulation target object included in the manipulation target image in the process (2) (image processing), it is possible to display an image in which the manipulation target object included in the manipulation target image is more clearly displayed, on the display screen. Accordingly, in the above case, the image processing apparatus according to the present embodiment can further improve, for example, the visibility of the manipulation target object included in the manipulation target image (i.e., a manipulation target object constituting a GUI).

Further, if the image processing apparatus according to the present embodiment determines the partial range in which the captured image is partially visualized, based on a predetermined target recognized from the captured image in the process (2) (image processing), a face of the user performing the manipulation is not displayed on the display screen, for example, as shown in FIGS. 9A to 10B. Accordingly, in the above case, the image processing apparatus according to the present embodiment can realize, for example, a mirror image representation causing the user not to feel vividness, thereby feeding the gesture recognition causing the user not to feel vividness back to the user.

Further, since the image processing apparatus according to the present embodiment changes the degree of visualization of the captured image in the process (2) (image processing), it is possible to control the visualization of a region unnecessary for a gesture-based manipulation in comparison with a case in which the captured image and the manipulation target image are simply combined and displayed on the display screen. Accordingly, the image processing apparatus according to the present embodiment, for example, can further facilitate a finer gesture-based manipulation by the user, thereby further improving maneuverability of the user.

Further, the image processing apparatus according to the present embodiment can display the image in the display target region corresponding to the manipulation target region on the display screen through the animation display, such as zooming, for example, through the process (2) (image processing) and the process (3) (display control process). By displaying the image in the display target region corresponding to the manipulation target region on the display screen through the animation display such as zooming, the image processing apparatus according to the present embodiment can cause the user to more readily recognize, from the image displayed on the display screen, a user whose gesture is currently recognized.

Further, the process according to the image processing method according to the present embodiment in the image processing apparatus according to the present embodiment is not limited to the process (1) (region setting process) to the process (3) (display control process). For example, the image processing apparatus according to the present embodiment may notify the user of a gesture manipulation possible in the manipulation target object based on the position of the recognition target object on which the gesture recognition is performed and the position of the manipulation target object manipulated according to a result of the gesture recognition included in the manipulation target image, in the combined image (notification process).

Here, an example of the recognition target object according to the present embodiment may include a gesture recognition target for recognition of a gesture of a user, such as a part of a body of the user such as a hand of the user or a shape of an object manipulated by the user.

FIGS. 19 to 21 are illustrative diagrams illustrating examples of the notification process in the image processing apparatus according to the present embodiment. Here, each of FIGS. 19 to 21 illustrates an example in which a gesture manipulation possible with respect to an icon constituting a GUI or content, which is selected by a hand of a user (an example of a recognition target object) is visually notified of through the notification process according to the present embodiment. Further, in FIGS. 19 to 21, an example in which the image processing apparatus according to the present embodiment has combined the captured image whose degree of visualization has been changed with the manipulation target image is illustrated simply.

For example, FIG. 19 illustrates an example in which the image processing apparatus according to the present embodiment displays auxiliary icons indicating scrollable directions (I1 and I2 in FIG. 19) on the display screen when the position of the hand of the user is present in a range in which an icon can be manipulated.

Further, for example, FIG. 20 illustrates an example in which the image processing apparatus according to the present embodiment displays an icon indicating a gesture by which content can be determined, on the display screen, when the position of the hand of the user is present in a range in which the content can be manipulated. Further, the image processing apparatus according to the present embodiment may notify the user of the gesture by which the content can be determined, through animation display.

Further, for example, FIG. 21 illustrates an example in which an icon indicating a gesture by which the content can be determined or a gesture by which the content can be switched is displayed on the display screen when the position of the hand of the user is present in a range in which the content can be manipulated. Further, the image processing apparatus according to the present embodiment may notify the user of the gesture by which the content can be determined or the gesture by which the content can be switched, through animation display.

Further, for example, as shown in FIG. 21, the image processing apparatus according to the present embodiment may notify the user whether an object can be manipulated by a gesture by changing representations of an object that can be manipulated by a gesture (A shown in FIG. 21) and objects difficult to be manipulated by a gesture (B to E shown in FIG. 21)). Here, an example of a representing method indicating whether manipulation can be performed by the gesture may include representation in which the degree of transparency is changed.

The image processing apparatus according to the present embodiment performs a process of visually notifying of a gesture manipulation possible in the manipulation target object, for example, as described above, as the notification process (4). Further, the notification process in the image processing apparatus according to the present embodiment is not limited to the process of visually notifying of a gesture manipulation possible in the manipulation target object as shown in FIGS. 19 to 21. For example, the image processing apparatus according to the present embodiment may notify of the gesture manipulation possible in the manipulation target object using an auditory notifying method using sound (including music or a beeping sound; the same applies hereinafter). Further, the image processing apparatus according to the present embodiment may perform a combination of visual notification and auditory notification.

Here, an example of a target that the image processing apparatus according to the present embodiment causes to perform the notification may include a display unit (which will be described below) or a sound output unit (which will be described below) included in the own apparatus (the image processing apparatus according to the present embodiment), and/or an external apparatus, such as an external display device or an external sound output device.

[2] One Example of Process According to Image Processing Method According to Present Embodiment FIG. 22 is a flow diagram illustrating an example of the process according to the image processing method according to the present embodiment. Hereinafter, the image processing apparatus according to the present embodiment will be described as performing the process illustrated in FIG. 22. Here, for example, a process of steps S100, S102, S110, and S112 in FIG. 22 corresponds to the process (1) (region setting process). Further, for example, a process of steps S104 to S108 and steps S114 and S116 in FIG. 22 corresponds to the process (2) (image processing) and the process (3) (display control process). Further, hereinafter, for example, the combined image will be described as being displayed on the display screen, basically, through the process (2) (image processing) and the process (3) (display control process) until the process of step S108 is performed after the process of step S102 is performed.

The image processing apparatus according to the present embodiment determines whether the gesture recognition starts (S100). Here, the image processing apparatus according to the present embodiment, for example, determines whether a start condition of gesture recognition (trigger of gesture recognition start) is satisfied, and determines that the gesture recognition starts if it is determined that the start condition of gesture recognition is satisfied.

If it is not determined in step S100 that the gesture recognition starts, the image processing apparatus according to the present embodiment does not proceed with the process until the gesture recognition is determined to start.

Further, when it is determined in step S100 that the gesture recognition starts, the image processing apparatus according to the present embodiment sets a manipulation target region (S102).

If the manipulation target region is set in step S102, the image processing apparatus according to the present embodiment performs a zoom animation display (S104). Here, an example of the zoom animation display in step S104 may include zoom-in display from a predetermined region larger than a display target region corresponding to the manipulation target region set in step S102 to the display target region.

Further, although not shown in FIG. 22, the apparatus that performs a process related to gesture recognition recognizes a gesture in the manipulation target region set in step S102 and performs a process according to a recognition result, subsequent to the process of step S102.

The image processing apparatus according to the present embodiment determines whether the gesture recognition in the apparatus that performs a process related to gesture recognition has ended (S106). If the apparatus that performs a process related to gesture recognition is the own apparatus (the image processing apparatus according to the present embodiment), the image processing apparatus according to the present embodiment, for example, determines whether the end condition of gesture recognition (trigger of gesture recognition end) is satisfied, and determines that the gesture recognition has ended if it is determined that the end condition of gesture recognition is satisfied, as in step S100. Further, the image processing apparatus according to the present embodiment may determine that the end condition of gesture recognition is satisfied, for example, if a manipulation or a motion of the detection target is not detected for a certain period of time or if content, an icon or the like is selected. Further, if the apparatus that performs a process related to gesture recognition is an external apparatus, the image processing apparatus according to the present embodiment determines that the gesture recognition has ended, for example, when receiving a signal indicating that the gesture recognition has ended, which is transmitted from the external apparatus.

If it is determined in step S106 that the gesture recognition in the apparatus that performs a process related to gesture recognition has ended, the image processing apparatus according to the present embodiment displays the manipulation target image on the display screen and ends image-based feedback to the user. Also, the image processing apparatus according to the present embodiment ends the process according to the image processing method according to the present embodiment.

Further, if it is not determined in step S106 that the gesture recognition in the apparatus that performs a process related to gesture recognition has ended, the image processing apparatus according to the present embodiment determines whether new gesture recognition starts (S110). Here, the image processing apparatus according to the present embodiment determines that the new gesture recognition starts if it is determined that the start condition of the new gesture recognition is satisfied, for example, through the same process as step S100. Further, a target on which the new gesture recognition determined in step S110 is performed, for example, may be a user different from the user corresponding to the manipulation target region which has already been set or may be the same user as the user corresponding to the manipulation target region which has already been set.

If it is not determined in step S110 that the new gesture recognition starts, the image processing apparatus according to the present embodiment repeats the process from step S106.

Further, if it is determined in step S110 that the new gesture recognition starts, the image processing apparatus according to the present embodiment sets the manipulation target region (S112), as in step S102.

If the manipulation target region is set in step S112, the image processing apparatus according to the present embodiment performs zoom animation display (S114 and S116). Also, the image processing apparatus according to the present embodiment repeats the process from step S106. Here, an example of the zoom animation display in step S114 may include zoom-out display from the display target region corresponding to the manipulation target region which has already been set, to a predetermined region larger than the display target region and a display target region corresponding to the manipulation target region newly set in step S112. Further, an example of the zoom animation display in step S116 may include zoom-in display from the predetermined region to the display target region corresponding to the manipulation target region newly set in step S112.

The image processing apparatus according to the present embodiment performs, for example, the process illustrated in FIG. 22 to realize the process (1) (region setting process) to the process (3) (display control process) according to the image processing method according to the present embodiment. Further, it is understood that the process according to the image processing method according to the present embodiment is not limited to the process illustrated in FIG. 22.

Image Processing Apparatus According to the Present Embodiment

Next, an example of a configuration of the image processing apparatus according to the present embodiment capable of performing the process according to the image processing method according to the present embodiment described above will be described.

FIG. 23 is a block diagram illustrating an example of a configuration of the image processing apparatus 100 according to the present embodiment. For example, the image processing apparatus 100 includes a communication unit 102 and a control unit 104.

Further, the image processing apparatus 100 may include, for example, a ROM (Read Only Memory; not shown), a RAM (Random Access Memory; not shown), a storage unit (not shown), a manipulation unit (not shown) that can be manipulated by the user, and a display unit (not shown) that displays various screens on a display screen. In the image processing apparatus 100, for example, the respective components are connected by a bus as a data transmission line.

Here, the ROM (not shown) stores a program or data for control such as calculation parameters, which is used by the control unit 104. The RAM (not shown) temporarily stores, for example, a program to be executed by the control unit 104.

The storage unit (not shown) is a storage medium included in the image processing apparatus 100, and stores, for example, various data such as data constituting the manipulation target image or applications. Here, examples of the storage unit (not shown) may include a magnetic recording medium such as a hard disk, and a non-volatile memory such as an EEPROM (Electrically Erasable and Programmable Read Only Memory) or a flash memory. Further, the storage unit (not shown) may be detachable from the image processing apparatus 100. Further, the manipulation unit (not shown) may include a manipulation input device, which will be described below, and the display unit (not shown) may include a display device, which will be described below.

Example of Hardware Configuration of Image Processing Apparatus 100

FIG. 24 is an illustrative diagram illustrating an example of a hardware configuration of the image processing apparatus 100 according to the present embodiment. The image processing apparatus 100 includes, for example, an MPU 150, a ROM 152, a RAM 154, a recording medium 156, an input and output interface 158, a manipulation input device 160, a display device 162, and a communication interface 164. Further, in the image processing apparatus 100, the respective components are connected, for example, by a bus 166 as a data transmission path.

The MPU 150, for example, functions as the control unit 104 that includes an MPU (Micro Processing Unit) or various processing circuits, and controls the entire image processing apparatus 100. Further, in the image processing apparatus 100, the MPU 150 plays the role of, for example, a region setting unit 110, an image processing unit 112, and a display control unit 114, which will be described below.

The ROM 152 stores a program or data for control, such as calculation parameters, which is used by the MPU 150. The RAM 154, for example, temporarily stores a program to be executed by the MPU 150.

The recording medium 156 functions as a storage unit (not shown) and stores, for example, various data such as data constituting the manipulation target image or applications. Here, an example of the recording medium 156 may include a magnetic recording medium such as a hard disk or a nonvolatile memory such as a flash memory. Further, the recording medium 156 may be detachable from the image processing apparatus 100.

The input and output interface 158 connects, for example, the manipulation input device 160 or the display device 162. The manipulation input device 160 functions as a manipulation unit (not shown), and the display device 162 functions as a display unit (not shown). Here, examples of the input and output interface 158 may include a USB (Universal Serial Bus) terminal, a DVI (Digital Visual Interface) terminal, an HDMI (High-Definition Multimedia Interface) terminal, and various processing circuits. Further, the manipulation input device 160 is provided, for example, on the image processing apparatus 100 and connected to the input and output interface 158 inside the image processing apparatus 100. An example of the manipulation input device 160 may include buttons, direction keys, a rotary type selector such as a jog dial, or a combination thereof. Further, the display device 162 is provided, for example, on the image processing apparatus 100 and connected to the input and output interface 158 inside the image processing apparatus 100. An example of the display device 162 may include a liquid crystal display (LCD) or an organic EL display (organic ElectroLuminescence display; also known as an OLED display (Organic Light Emitting Diode display)).

Further, it is understood that the input and output interface 158 is connected to external devices, such as a manipulation input device (e.g., a keyboard or a mouse) and a display device, that are devices external to the image processing apparatus 100. Further, the display device 162 may be, for example, a device in which both display and user manipulation are possible, such as a touch screen.

The communication interface 164 is a communication medium included in the image processing apparatus 100 and functions as the communication unit 102 for performing wireless/wired communication with the imaging apparatus, the display device, or an external device such as a server via a network (or directly). Here, an example of the communication interface 164 may include a communication antenna and an RF (Radio Frequency) circuit (wireless communication), an IEEE802.15.1 port and a transmission and reception circuit (wireless communication), an IEEE802.11b port and a transmission and reception circuit (wireless communication), or a LAN (Local Area Network) terminal and a transmission and reception circuit (wired communication). Further, an example of the network according to the present embodiment may include a wired network such as a LAN or a WAN (Wide Area Network), a wireless network such as a wireless LAN (WLAN; Wireless Local Area Network) or a wireless WAN (WWAN; Wireless Wide Area Network) via a base station, or the Internet using a communication protocol, such as TCP/IP (Transmission Control Protocol/Internet Protocol).

The image processing apparatus 100 performs the process according to the image processing method according to the present embodiment, for example, through the configuration shown in FIG. 24. A hardware configuration of the image processing apparatus 100 according to the present embodiment is not limited to the configuration shown in FIG. 23. For example, the image processing apparatus 100 may include an imaging device serving as an imaging unit (not shown) that captures a still image or a moving image. If the imaging device is included, the image processing apparatus 100 can process, for example, the captured image that is generated by the imaging in the imaging device.

Here, examples of the imaging device according to the present embodiment may include a lens/imaging element and a signal processing circuit. The lens/imaging element includes, for example, a lens of an optical system, and an image sensor using a plurality of CMOS (Complementary Metal Oxide Semiconductor) imaging elements. Further, the signal processing circuit includes, for example, an AGC (Automatic Gain Control) circuit or an ADC (Analog to Digital Converter), and converts an analog signal generated by the imaging element into a digital signal (image data) to perform various signal processing. Examples of signal processing performed by the signal processing circuit may include a white balance correction process, a tint correction process, a gamma correction process, a YCbCr conversion process, and an edge enhancement process.

Further, the image processing apparatus 100 may further include, for example, a DSP (Digital Signal Processor) and a sound output device. An example of the sound output device according to the present embodiment may include an amplifier and a speaker. When the DSP and the sound output device are further included, the image processing apparatus 100 can perform notification of, for example, gesture manipulation that is possible in the manipulation target object, using the sound output from the sound output device.

Further, when the image processing apparatus 100 has, for example, a configuration that performs processing in a stand-alone manner, the image processing apparatus 100 may not include the communication interface 164. Further, the image processing apparatus 100 may have a configuration in which the manipulation input device 160 or the display device 162 is not included.

Referring to FIG. 23 again, an example of the configuration of the image processing apparatus 100 will be described. The communication unit 102 is a communication medium included in the image processing apparatus 100, and performs wireless/wired communication with an external device such as an imaging apparatus, a display device, or a server via the network (or directly). Further, communication of the communication unit 102 is controlled, for example, by the control unit 104. Here, the communication unit 102 may include, for example, a communication antenna and an RF circuit or a LAN terminal and a transmission and reception circuit, but the configuration of the communication unit 102 is not limited thereto. For example, the communication unit 102 may have a configuration corresponding to any standard in which communication is possible, such as a USB terminal and a transmission and reception circuit, or may have any configuration capable of communication with an external device via a network.

The control unit 104 includes, for example, an MPU, and serves to control the entire image processing apparatus 100. Further, the control unit 104 includes, for example, the region setting unit 110, the image processing unit 112, and the display control unit 114, and plays a leading role in performing the process according to the image processing method according to the present embodiment.

The region setting unit 110 plays a leading role in performing the process (1) (region setting process), for example, to set the manipulation target region in a part of the captured image.

The image processing unit 112 plays a leading role in performing the process (2) (image processing) to combine the image in the display target region corresponding to the manipulation target region set in the region setting unit 110 with the manipulation target image. Further, the image processing unit 112 may change the degree of visualization of the captured image, for example, based on the captured image or the manipulation target image and combine the image in the display target region corresponding to the manipulation target region set in the region setting unit 110 with the manipulation target image.

The display control unit 114 plays a leading role in the process (3) (display control process), and displays the image combined by the image processing unit 112 on the display screen.

As the control unit 104 includes, for example, the region setting unit 110, the image processing unit 112, and the display control unit 114, the control unit 104 plays a leading role in the processes according to the image processing method according to the present embodiment (e.g., the process (1) (region setting process) to the process (3) (display control process)).

Further, the configuration of the control unit according to the present embodiment is not limited to the configuration shown in FIG. 23. For example, the control unit according to the present embodiment may further include a notification processing unit (not shown) that performs the process (4) (notification process). Further, the control unit according to the present embodiment, for example, may further include a gesture recognition processing unit (not shown) that recognizes a gesture in the set manipulation target region and performs a process related to the recognized gesture.

The image processing apparatus 100 performs the processes according to the image processing method according to the present embodiment (e.g., the process (1) (region setting process) to the process (3) (display control process)), for example, using the configuration shown in FIG. 23. Accordingly, the image processing apparatus 100 can display the captured image and the manipulation target image on the display screen while preventing the decrease in visibility of the manipulation target object and preventing degradation of the maneuverability of the user, for example, using the configuration shown in FIG. 23.

Further, a configuration of the image processing apparatus according to the present embodiment is not limited to the configuration shown in FIG. 23. For example, the image processing apparatus according to the present embodiment may individually include the region setting unit 110, the image processing unit 112, and the display control unit 114 shown in FIG. 23, the notification processing unit (not shown), or the gesture recognition processing unit (not shown) (realize the respective units as individual processing circuits).

Further, the image processing apparatus according to the present embodiment may include, for example, an imaging unit (not shown). If the image processing apparatus includes the imaging unit (not shown), the image processing apparatus according to the present embodiment can process a captured image generated by the imaging in the imaging unit (not shown).

Further, the image processing apparatus according to the present embodiment may include, for example, a sound output unit (not shown) capable of outputting sound. Here, examples of the sound output unit (not shown) may include a DSP and a sound output device. When the image processing apparatus includes the sound output unit (not shown), the image processing apparatus according to the present embodiment can perform a variety of notifications for the user, such as notification of a gesture manipulation possible in the manipulation target object or an error, using the sound output by the sound output unit (not shown).

Further, when the image processing apparatus according to the present embodiment has, for example, a configuration that performs processing in a stand-alone manner, the image processing apparatus may not include the communication unit 102.

As described above, the image processing apparatus according to the present embodiment performs, for example, the process (1) (region setting process), the process (2) (image processing), and the process (3) (display control process) as the processes according to the image processing method according to the present embodiment. The image processing apparatus according to the present embodiment sets the manipulation target region in the process (1) (region setting process). Further, the image processing apparatus according to the present embodiment combines the image corresponding to the display target region (a region corresponding to the manipulation target region) in the captured image with the manipulation target image in the process (2) (image processing). Also, the combined image is displayed on the display screen through the process (3) (display control process).

Here, since the image processing apparatus according to the present embodiment combines the image corresponding to the display target region corresponding to the set manipulation target region with the manipulation target image in the process (2) (image processing), difficulty for the user in manipulating manipulation target objects arranged within the display screen is prevented.

Accordingly, the image processing apparatus according to the present embodiment can display the captured image and the manipulation target image on the display screen while preventing degradation of maneuverability of the user.

Further, the image processing apparatus according to the present embodiment may change the degree of visualization of the captured image in the process (2) (image processing). When the degree of visualization of the captured image is changed in the process (2) (image processing), the image processing apparatus according to the present embodiment can prevent the decrease in visibility of the manipulation target object in comparison with a case in which the captured image and the manipulation target image are simply combined and displayed on the display screen. Accordingly, if the degree of visualization of the captured image is changed in the process (2) (image processing), the image processing apparatus according to the present embodiment can display the captured image and the manipulation target image on the display screen while preventing the decrease in visibility of the manipulation target object and preventing degradation of maneuverability of the user.

Further, the image processing apparatus according to the present embodiment sets the manipulation target region, for example, according to a position or a posture of the user, a size of a face or a hand, or the like in the process (1) (region setting process). As the manipulation target region is set from the size of the face or the hand, or the like, the user can perform a gesture manipulation with the same manipulation sense, for example, even in a position close to a camera or even in a position away from the camera. Further, as the image processing apparatus according to the present embodiment dynamically updates (resets) the manipulation target region according to a movement of the detection target, such as a face or a hand, the user can continuously perform the manipulation even when a manipulator (user) moves during the gesture manipulation.

Further, the image processing apparatus according to the present embodiment can display the image of the display target region corresponding to the manipulation target region on the display screen through the animation display, such as zooming, for example, through the process (2) (image processing) and the process (3) (display control process). By displaying the image of the display target region corresponding to the manipulation target region on the display screen through the animation display, such as zooming, the image processing apparatus according to the present embodiment can cause the user to more readily recognize a user whose gesture is currently recognized from the image displayed on the display screen. Further, as the image of the display target region corresponding to the manipulation target region is displayed on the display screen through the animation display, such as zooming, the manipulator (user) can recognize where the manipulation target region has been set, for example, even when the image processing apparatus according to the present embodiment inevitably sets the manipulation target region in a range different from a range intended by the manipulator, such as when the manipulator protrudes outside a field of view of the camera. Further, as the image of the display target region corresponding to the manipulation target region is displayed on the display screen through the animation display, such as zooming, the user can recognize where the user has to move his or her hand or the like to be able to perform a gesture manipulation even when the manipulation target region is changed according to the position and posture of the recognized user (e.g., sitting, standing, or lying down). Further, as the image of the display target region corresponding to the manipulation target region is displayed on the display screen through the animation display, such as zooming, the user can immediately recognize that the manipulator has been switched.

The image processing apparatus has been described above as the present embodiment, but the present embodiment is not limited to such an embodiment. The present embodiment may be applied to, for example, a variety of devices capable of processing an image and controlling display on the display screen, such as a communication device such as a mobile phone or a smartphone, a video/music player device (or a video/music recording and reproducing device), a game machine, a computer such as a PC (Personal Computer) or a server, a display device such as a television receiver, or an imaging apparatus such as a digital camera. Further, the present embodiment may be applied to, for example, a processing IC (Integrated Circuit) that can be incorporated into such devices.

Further, the process according to the image processing method according to the present embodiment may be realized by an image processing system including a plurality of devices on the assumption of a connection to a network (or communication between respective devices) such as, for example, cloud computing.

Program According to the Present Embodiment

A program for causing a computer to function as the image processing apparatus according to the present embodiment (e.g., a program capable of executing the process according to the image processing method according to the present embodiment, such as "the process (1) (region setting process) to the process (3) (display control process)" or "the process (1) (region setting process) to the process (4) (notification process)") is executed in the computer, thereby displaying the captured image and the manipulation target image on the display screen while preventing a decrease in the visibility of the manipulation target object and preventing degradation of maneuverability of the user.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, while in the above description, provision of the program (computer program) for causing the computer to function as the image processing apparatus according to the present embodiment has been shown, the present embodiment may further provide a recording medium having the program stored thereon together.

The configuration described above is an example of the present embodiment and, of course, is within the technical scope of the present disclosure.

Additionally, the present technology may also be configured as below.

(1) An image processing apparatus including:
a region setting unit that sets a manipulation target region in a part of a captured image for feeding a gesture operation back to a user, the manipulation target region being a region in which gesture recognition is performed;
an image processing unit that combines an image in a display target region with a manipulation target image to be manipulated according to a result of the gesture recognition, the display target region being a region corresponding to the manipulation target region to be displayed on a display screen in the captured image; and
a display control unit that displays a combined image on the display screen.

(2) The image processing apparatus according to (1), wherein the manipulation target region set by the region setting unit is a region smaller than an entire region of the captured image and larger than the display target region.

(3) The image processing apparatus according to (1) or (2), wherein
the region setting unit sets the manipulation target region based on one or two or more of a position and a size of a detection target in the captured image, a motion of the detection target, a posture of a user, a shape of the detection target, and a size of a manipulation target object included in the manipulation target image.

(4) The image processing apparatus according to any one of (1) to (3), wherein
the manipulation target image includes a region in which a gesture is recognized and a region in which a gesture is not recognized, and
the image processing unit does not combine the captured image in the region of the manipulation target image in which a gesture is not recognized.

(5) The image processing apparatus according to any one of (1) to (4), wherein
the region setting unit determines whether a start condition of gesture recognition is satisfied, and sets the manipulation target region when the region setting unit determines that the start condition of gesture recognition is satisfied.

(6) The image processing apparatus according to any one of (1) to (5), wherein
when the region setting unit sets the manipulation target region, the image processing unit sequentially changes a position and a size of a region in the captured image to be combined with the manipulation target image from a position and a size of a predetermined region larger than the display target region to a position and a size of the display target region, and sequentially combines an image corresponding to a region whose position and size are sequentially changed with the manipulation target image.

(7) The image processing apparatus according to any one of (1) to (5), wherein
when the region setting unit sets a new manipulation target region different from the manipulation target region that has already been set, the image processing unit sequentially changes a position and a size of a region in the captured image to be combined with the manipulation target image from a position and a size of the display target region corresponding to the manipulation target region that has already been set to a position and a size of a predetermined region larger than the display target region, and
when the position and the size of the region in the captured image are changed to the position and the size of the predetermined region, the image processing unit sequentially changes the position and the size of the region in the captured image from the position and the size of the predetermined region to the position and the size of the display target region corresponding to the manipulation target region that has been newly set, and
sequentially combines an image corresponding to a region whose position and size are sequentially changed with the manipulation target image.

(8) The image processing apparatus according to any one of (1) to (5), wherein
when the region setting unit sets a new manipulation target region different from the manipulation target region that has already been set, the image processing unit changes a position of a region in the captured image to be combined with the manipulation target image in a manner that the position of the region in the captured image is moved from the display target region corresponding to the manipulation target region that has already been set to the display target region corresponding to the new manipulation target region that has been set.

(9) The image processing apparatus according to any one of (1) to (8), further including:
a notification processing unit that notifies a user of a gesture manipulation possible in the manipulation target object, based on a position of a recognition target object on which gesture recognition is performed and a position of a manipulation target object manipulated according to a result of the gesture recognition included in the manipulation target image, in the combined image.

(10) The image processing apparatus according to (1), wherein
the image processing unit changes a degree of visualization of the captured image based on the captured image, and combines an image in the display target region in the captured image whose degree of visualization has been changed with the manipulation target image.

(11) The image processing apparatus according to (10), wherein
the image processing unit changes a partial range in which the captured image is partially visualized as a change in the degree of visualization.

(12) The image processing apparatus according to (11), wherein
the image processing unit determines the partial range based on a predetermined target recognized from the captured image.

(13) The image processing apparatus according to (11), wherein
the image processing unit changes a degree of transparency of the captured image or a display area of the captured image, as partial visualization of the captured image.

(14) The image processing apparatus according to (10), wherein
the image processing unit changes a degree of smoothing to smooth the captured image as a change in the degree of the visualization.

(15) An image processing method including:
setting a manipulation target region in a part of a captured image for feeding a gesture operation back to a user, the manipulation target region being a region in which gesture recognition is performed;
combining an image in a display target region with a manipulation target image to be manipulated according to a result of the gesture recognition, the display target region being a region corresponding to the manipulation target region to be displayed on a display screen in the captured image; and
displaying a combined image on the display screen.

(16) A program for causing a computer to execute:
setting a manipulation target region in a part of a captured image for feeding a gesture operation back to a user, the manipulation target region being a region in which gesture recognition is performed;
combining an image in a display target region with a manipulation target image to be manipulated according to a result of the gesture recognition, the display target region being a region corresponding to the manipulation target region to be displayed on a display screen in the captured image; and
displaying a combined image on the display screen.

(17) An information processing system including: circuitry configured to: acquire image data captured by an imaging device; set a manipulation target region based on the detection of an object in the acquired image data, the manipulation target region being set to have an area covering an entire area of a display; control the display to display a manipulation target image in the area of the display corresponding to the manipulation target region; and detect an input to the manipulation target image based on the acquired image data.

(18) The information processing system of (17), wherein the circuitry is configured to control the display to display at least a portion of the acquired image data that includes the detected object together with the manipulation target region.

(19) The information processing system of (18), wherein the circuitry is configured to control the display to apply a predetermined effect to the at least a portion of the acquired image data that includes the detected object.

(20) The information processing system of any of (18) to (19), wherein the circuitry is configured to control the display to apply a predetermined effect to the detected object included in the at least a portion of the acquired image data.

(21) The information processing system of any of (17) to (20), wherein the circuitry is configured to detect a hand in the acquired image data, and set the manipulation target region based on the detection of the hand.

(22) The information processing system of (21), wherein the circuitry is configured to set the manipulation target region based on at least one of a size and a position of the hand detected in the image data.

(23) The information processing system of any of (21) to (22), wherein the circuitry is configured to set, as the manipulation target region, a region having a size including the detected hand, which is smaller than a size corresponding to the acquired image data.

(24) The information processing system of any of (17) to (23), wherein the circuitry is configured to detect a face in the acquired image data, and set the manipulation target region based on the detection of the face.

(25) The information processing system of (24), wherein the circuitry is configured to set the manipulation target region based on at least one of a size and a position of the detected face.

(26) The information processing system of any of (24) to (25), wherein the circuitry is configured to set, as the manipulation target region, a region having a size including the detected face, which is smaller than a size corresponding to the acquired image data.

(27) The information processing system of (24), wherein the circuitry is configured to: identify a user corresponding to the detected face; acquire information indicating a handedness of the identified user; and set the manipulation target region based on the handedness of the user.

(28) The information processing system of (24), wherein the circuitry is configured to detect a user's posture from the acquired image data, and set the manipulation target region based on the detected posture and a position of the detected face in the acquired image data.

(29) The information processing system of any of (17) to (28), wherein the circuitry is configured to detect at least one of a movement and shape of the object in the acquired image data, and set the manipulation target region based on the detected at least one of the movement and shape of the object.

(30) The information processing system of any of (17) to (29), wherein the manipulation target image includes a plurality of selectable manipulation target objects, and the circuitry is configured to detect, as the input to the manipulation target image, a selection of one of the plurality of selectable manipulation target objects.

(31) The information processing system of any of (17) to (30), wherein the manipulation target image includes a first area including a first manipulation target object capable of being manipulated by a detected input, and a second area including a second manipulation target object not capable of being manipulated by a detected input.

(32) The information processing system of any of (17) to (31), wherein the circuitry is configured to detect a gesture input based on the acquired image data.

(33) The information processing system of (31), wherein the circuitry is configured to control the display to display at least a portion of the acquired image data in the first area and not display any of the image data in the second area.

(34) The information processing system of (31), wherein the circuitry is configured to control the display to display at least a portion of the acquired image data in the first and second areas, wherein a predetermined effect is applied to the displayed at least a portion of the acquired image data to differentiate the at least a portion of the acquired image data displayed in the first area from the at least a portion of the acquired image data displayed in the second area.

(35) The information processing system of any of (17) to (34), wherein the circuitry is configured to: detect a second object in the acquired image data; set a second manipulation target region based on the detection of the second object from the acquired image data; and control the display to display notification indicating a change from the manipulation target region to the second manipulation target region.

(36) The information processing system of (35), wherein the circuitry is configured to control the display to display then notification by performing a zoom-in and zoom-out on at least a portion of the acquired image data displayed on the display.

(37) The information processing system of any of (17) to (36), wherein the circuitry is configured to control the display to output a notification that the detected object is outside of a range for detecting an input to the manipulation target image based on the acquired image data.

(38) The information processing system of (37), wherein the circuitry is configured to control the display to output instructions indicating a direction that the detected object should move to be located in the range for detecting an input to the manipulation target image.

(39) The information processing system of any of (17) to (38), wherein the circuitry is configured to set the manipulation target region to have an area covering an entire area of the display.

(40) The information processing system of any of (17) to (38), wherein the circuitry is configured to set the manipulation target region to have a larger area than the entire area of the display.

(41) The information processing system of any of (17) to (40), wherein the circuitry is configured to detect an input to the manipulation target image based on the acquired image data.

(42) A method performed by an information processing system, the method including: controlling a display to display an image generated based on a manipulation target image and an image based on a manipulation target region that is set based on a detection of an object included in acquired image data.

(43) A non-transitory computer-readable medium including computer-program instructions, which when executed by an information processing system, cause the information processing system to: control a display to display an image generated based on a manipulation target image and an image based on a manipulation target region that is set based on a detection of an object included in acquired image data.

REFERENCE SIGNS LIST

100 Image processing apparatus
102 Communication unit
104 Control unit
110 Region setting unit
112 Image processing unit
114 Display control unit

The invention claimed is:

1. An information processing system comprising:
processing circuitry configured to:
control a display to display an image generated based on a manipulation target image, wherein the manipulation target image includes a first area including a first manipulation target object capable of being manipulated and a second area including a second manipulation target object not capable of being manipulated; and
apply a predetermined effect to the displayed image to differentiate the first area from the second area.

2. The system of claim 1, wherein the predetermined effect includes display of an image that is superimposed on the first manipulation target object.

3. The system of claim 2, wherein
capable of being manipulated includes capable of having an image superimposed thereupon, and
and not capable of being manipulated includes not capable of having an image superimposed thereupon.

4. The system of claim 2, further comprising an image capturing device, wherein the predetermined effect is applied based upon data received from the image capturing device.

5. The system of claim 2, further comprising a hand held device, wherein the predetermined effect is applied based upon data received from the hand held device.

6. The system of claim 1, wherein
capable of being manipulated includes capable of having an image superimposed thereupon, and
not capable of being manipulated includes not capable of having an image superimposed thereupon.

7. The system of claim 1, further comprising an image capturing device, wherein the predetermined effect is applied based upon data received from the image capturing device.

8. The system of claim 1, further comprising a hand held device, wherein the predetermined effect is applied based upon data received from the hand held device.

9. An information processing method comprising:
controlling, via processing circuitry, a display to display an image generated based on a manipulation target image, wherein the manipulation target image includes a first area including a first manipulation target object capable of being manipulated and a second area including a second manipulation target object not capable of being manipulated; and
applying, via the processing circuitry, a predetermined effect to the displayed image to differentiate the first area from the second area.

10. The method of claim 9, wherein the predetermined effect includes display of an image that is superimposed on the first manipulation target object.

11. The method of claim 10, wherein
capable of being manipulated includes capable of having an image superimposed thereupon, and
not capable of being manipulated includes not capable of having an image superimposed thereupon.

12. The method of claim 10, further comprising applying the predetermined effect based upon data received from an image capturing device.

13. The method of claim 10, further comprising applying the predetermined effect based upon data received from a hand held device.

14. The method of claim 9, wherein
capable of being manipulated includes capable of having an image superimposed thereupon, and not capable of being manipulated includes not capable of having an image superimposed thereupon.

15. The method of claim 9, further comprising applying the predetermined effect based upon data received from an image capturing device.

16. The method of claim 9, further comprising applying the predetermined effect based upon data received from a hand held device.

17. A non-transitory computer readable medium storing instructions, which when executed by a computer, cause the computer to perform a method, the method comprising:
controlling a display to display an image generated based on a manipulation target image, wherein the manipulation target image includes a first area including a first manipulation target object capable of being manipulated and a second area including a second manipulation target object not capable of being manipulated; and
applying a predetermined effect to the displayed image to differentiate the first area from the second area.

\* \* \* \* \*